United States Patent
Sakai

(10) Patent No.: US 9,688,114 B2
(45) Date of Patent: Jun. 27, 2017

(54) ELECTRICALLY DRIVEN VEHICLE

(75) Inventor: Kazuhito Sakai, Makinohara (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 850 days.

(21) Appl. No.: 13/520,461

(22) PCT Filed: Jan. 25, 2010

(86) PCT No.: PCT/JP2010/050909
§ 371 (c)(1),
(2), (4) Date: Jul. 3, 2012

(87) PCT Pub. No.: WO2011/089726
PCT Pub. Date: Jul. 28, 2011

(65) Prior Publication Data
US 2012/0324934 A1    Dec. 27, 2012

(51) Int. Cl.
*F25B 27/00*    (2006.01)
*B60H 1/00*    (2006.01)
*B60H 1/22*    (2006.01)

(52) U.S. Cl.
CPC ..... *B60H 1/00385* (2013.01); *B60H 1/00264* (2013.01); *B60H 1/00392* (2013.01);
(Continued)

(58) Field of Classification Search
CPC ...... F25B 27/00; F25B 27/02; B60H 1/00264; B60H 1/00385; B60H 1/00392;
(Continued)

(56) References Cited

U.S. PATENT DOCUMENTS

| | | | |
|---|---|---|---|
| 5,664,635 A | * | 9/1997 | Koga ............. B60K 6/46 180/65.245 |
| 2003/0217559 A1 | | 11/2003 | Ieda et al. |

(Continued)

FOREIGN PATENT DOCUMENTS

| | | |
|---|---|---|
| DE | 10 2007 051 311 A1 | 4/2009 |
| JP | 57 172320 | 10/1982 |

(Continued)

OTHER PUBLICATIONS

International Search Report Issued Feb. 23, 2010 in PCT/JP10/50909 Filed Jan. 25, 2010.

(Continued)

*Primary Examiner* — Len Tran
*Assistant Examiner* — Ana Vazquez
(74) *Attorney, Agent, or Firm* — Oblon, McClelland, Maier & Neustadt, L.L.P.

(57) ABSTRACT

An electrically driven vehicle includes: a vehicle body provided with the vehicle interior, a battery which is mounted to the vehicle body and is able to be used for running, an electric heater which executes an air-conditioning operation which uses an electrical power of the battery when air-conditioning vehicle interior, a power generation device which is at least partly removably mounted to the vehicle body and executes another air-conditioning operation other than the air-conditioning operation which uses the electrical power of the battery when air-conditioning the vehicle interior, and an air conditioning change unit which changes the use state of at least one of the electric heater and the power generation device.

15 Claims, 14 Drawing Sheets

(52) U.S. Cl.
CPC ......... *B60H 1/2203* (2013.01); *B60H 1/2215* (2013.01); *B60H 2001/224* (2013.01); *B60H 2001/2253* (2013.01); *H01M 2220/20* (2013.01); *H01M 2250/20* (2013.01); *Y02T 90/32* (2013.01)

(58) Field of Classification Search
CPC ......... B60H 1/3222; B60H 2001/2253; B60H 1/2215; B60H 2001/224; H01M 2250/20; H01M 2220/20; Y02T 90/32
USPC .............................. 62/243, 244, 323.1, 323.3
See application file for complete search history.

(56) References Cited

U.S. PATENT DOCUMENTS

| | | | |
|---|---|---|---|
| 2004/0108151 A1* | 6/2004 | Guidry et al. | ............... 180/65.3 |
| 2004/0168454 A1* | 9/2004 | Iritani | ............................. 62/230 |
| 2009/0130513 A1 | 5/2009 | Tsuchiya et al. | |
| 2009/0283604 A1* | 11/2009 | Martinchick | ...... B60H 1/00392 237/12.3 B |

FOREIGN PATENT DOCUMENTS

| | | |
|---|---|---|
| JP | 61 157013 | 9/1986 |
| JP | 3 64110 | 6/1991 |
| JP | 8 268036 | 10/1996 |
| JP | 10 145905 | 5/1998 |
| JP | 2005 299425 | 10/2005 |
| JP | 2008 296646 | 12/2008 |
| JP | 2009 154853 | 7/2009 |

OTHER PUBLICATIONS

Extended European Search Report issued Apr. 16, 2014 in Patent Application No. 10843891.2.

* cited by examiner

ELECTRICALLY DRIVEN VEHICLE

TECHNICAL FIELD

The present invention is related to an electrically driven vehicle, and is especially related to an electrically driven vehicle which air-conditions a vehicle interior.

BACKGROUND ART

There has been conventionally known an electrically driven vehicle which air-conditions a vehicle interior. For example, Patent Document 1 discloses an electric vehicle including: a power generator for charging a battery as the source of electrical energy for a running motor; and an engine for electric power generation which drives the power generator, and provides heating and cooling by activating a compressor of an air conditioner by driving the engine for electric power generation.

In addition, the art disclosed in, for example, Patent Document 2 or 3 appears to be related to the present invention because it includes a sub-engine which drives a power generator and utilizes waste heat of the sub-engine for air heating, and the art disclosed in, for example, Patent Document 4 appears to be related to the present invention because it executes an air-conditioning control based on the temperature information of the vehicle interior.

PRIOR ART DOCUMENT

Patent Document

[Patent Document 1] Japanese Patent Application Publication No. 10-145905
[Patent Document 2] Japanese Patent Application Publication No. 2005-299425
[Patent Document 3] Japanese Utility Model Application Publication No. 61-157013
[Patent Document 4] Japanese Utility Model Application Publication No. 3-64110

SUMMARY OF THE INVENTION

Problems to be Solved by the Invention

In an electrically driven vehicle provided with a battery, when air-conditioning the vehicle interior, it is considered to execute an air-conditioning operation which uses the battery power (e.g. the air heating operation with an electric heater which uses the battery power). However, the air-conditioning operation described above generally consumes large amount of the battery power, and thereby may cause a great decrease in the cruising distance of the vehicle. On this matter, the electric vehicle disclosed in Patent Document 1 activates the compressor of the air conditioner by driving an engine for electric power generation, and executes the air-conditioning operation. Therefore, it is considered that such an electric vehicle may avoid a great decrease in the cruising distance of the vehicle due to the execution of the air-conditioning operation.

However, the electric vehicle disclosed in Patent Document 1 equips an engine for electric power generation at all time. Thus, the weight of the engine for electric power generation increases the weight of this electric vehicle, and decreases the energy efficiency.

On the other hand, on this issue, it is considered to mount the air conditioning means for executing the air-conditioning operation to the vehicle body at least partly removably. In this case, the decrease in energy efficiency due to the increase of the weight can be suppressed, by attaching or detaching the air conditioning means as necessary.

However, in this case, if the air conditioning means is not mounted, the air-conditioning operation is never executed. Therefore, in this case, when the vehicle is driven in a state where the air conditioning means is not mounted, it is necessary to give up the air conditioning or to mount the air conditioning means for the air conditioning even though the traveling time or the traveling distance is relatively short, and thereby there may be a case to cause people inconvenience.

The present invention was made in view of the above problems, and has an object of providing an electrically driven vehicle which can ensure the cruising distance, suppress the decrease in energy efficiency due to the increase of the weight, and ensure the properness of the use of the air conditioning simultaneously.

Means for Solving the Problems

To solve the above problems, the present invention provides an electrically driven vehicle including: a vehicle body provided with a vehicle interior, a battery which is mounted to the vehicle body and is able to be used for running; a first air conditioning means which executes an air-conditioning operation which uses an electrical power of the battery when air-conditioning the vehicle interior; a second air conditioning means which is at least partly removably mounted to the vehicle body, and executes an air-conditioning operation other than the air-conditioning operation which uses the electrical power of the battery when air-conditioning the vehicle interior; and an air conditioning change means which changes at least one of use states of the first air conditioning means and the second air conditioning means, wherein the second air conditioning means is at least one of an air conditioning means which generates electric power by using fuel and executes an air-conditioning operation which uses waste heat in electric power generation and an air conditioning means which generates electric power by using fuel and executes an air-conditioning operation which uses heat released from a cooling medium.

In addition, it is preferable that the present invention has a configuration where the air conditioning change means switches an air conditioning means to be used between the first air conditioning means and the second air conditioning means.

In addition, it is preferable that the present invention has a configuration where the air conditioning change means switches the air conditioning means to be used between the first air conditioning means and the second air conditioning means in accordance with whether the second air conditioning means is able to operate.

In addition, it is preferable that the present invention has a configuration where the air conditioning change means adjusts a use ratio between the first air conditioning means and the second air conditioning means.

In addition, it is preferable that the present invention has a configuration where the air conditioning change means changes the use ratio in accordance with an amount of charge of the battery.

In addition, it is preferable that the present invention has a configuration where an operation means capable of adjusting the use ratio is further provided, and the air conditioning change means adjusts the use ratio in accordance with a state of the operation means.

In addition, it is preferable that the present invention has a configuration where the air conditioning change means adjusts an air-conditioning capacity of the first air conditioning means so that the air-conditioning capacity of the first air conditioning means is decreased in a case where a difference between a target temperature set for executing the air-conditioning operation and an actual temperature inside the vehicle interior is small in a state where at least the first air conditioning means executes the air-conditioning operation.

In addition, it is preferable that the present invention has a configuration where a blast means common to the first air conditioning means and the second air conditioning means is provided when air-conditioning the vehicle interior.

Effects of the Invention

According to the present invention, it is possible to ensure the cruising distance, suppress the decrease in energy efficiency due to the increase of the weight and ensure the properness of the use of the air conditioning simultaneously.

MODES FOR CARRYING OUT THE INVENTION

Hereinafter, a detail description will be given of modes for carrying out the present invention with reference to drawings.

First Embodiment

Figure 1:
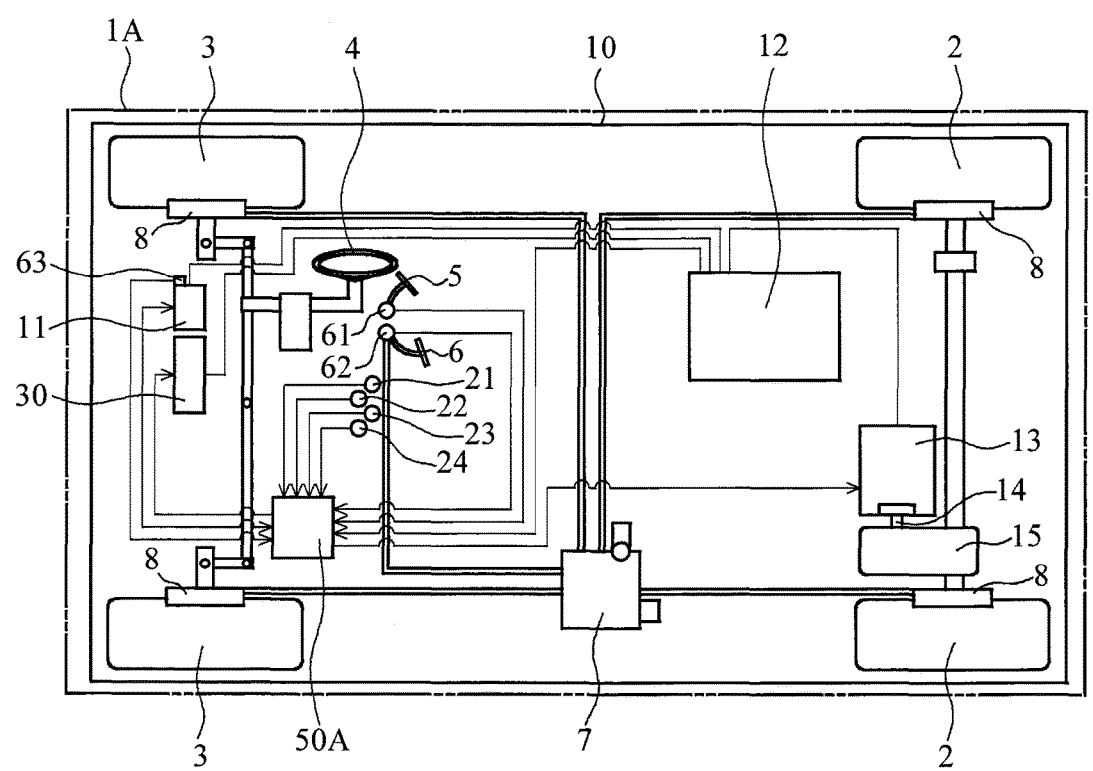
FIG. 1 is a diagrammatic configuration drawing of an electrically driven vehicle in accordance with a first embodiment.

As illustrated in FIG. 1, an electrically driven vehicle 1A is provided with a vehicle body 10, and provided with a power generation device 11, a battery 12 and an electric motor 13 which are mounted to the vehicle body 10. The electrically driven vehicle 1A equips the power generation device 11 removably. The electrically driven vehicle 1A to which the power generation device 11 is mounted removably can operate in a state where the power generation device 11 is not mounted and the electrical connection with the power generation device 11 is being cut.

Figure 2:
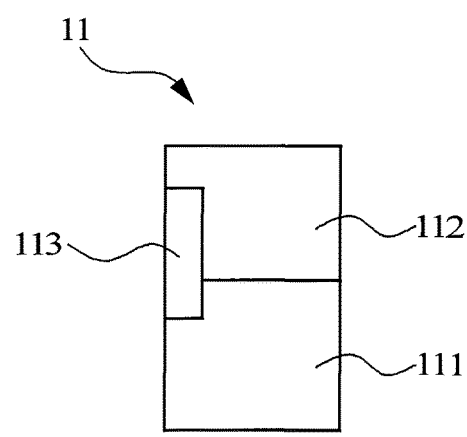
FIG. 2 is a diagram illustrating a power generation device.

The power generation device 11 is a power generation device driven by an engine, and is provided with an engine 111, a power generator 112 and a power-generation-device-side ECU 113 as illustrated in FIG. 2. The engine 111 drives the power generator 112, and the driven power generator 112 generates an alternate current. The generated alternate current is rectified to a direct current with an unillustrated rectifier circuit before used for charging the battery 12. The power-generation-device-side ECU 113 is provided for controlling the engine 111 mainly.

As illustrated in FIG. 1, the battery 12 is a direct current battery, and is electrically and removably coupled to the power generation device 11 through a high voltage wiring which is the wiring for a power system. The battery 12 is charged by the electrical power generated by the power generation device 11 via the high voltage wiring. Serially-connected batteries, each having a rated voltage of DC 12V, can be used for the battery 12. The electric motor 13 is a running drive source comprised of an electric motor, and is a direct current motor. The electric motor 13 is supplied with the electrical power from the battery 12, and rotates an output shaft 14. The rotation output is transmitted to a pair of rear wheels 2 which are drive wheels via a transmission 15, and thereby the rear wheels 2 are driven. As described above, the electrically driven vehicle 1A is a series hybrid electrically driven vehicle.

In addition to a pair of rear wheels 2 which are drive wheels, the electrically driven vehicle 1A is provided with a pair of front wheels 3 which are steering wheels, a steering wheel 4 for manually steering front wheels 3, an accelerator pedal 5 for changing the motor rotation speed of the electric motor 13, a brake pedal 6 and a brake unit 7 for braking the vehicle, and drum breaks 8 which are wire-connected to the brake pedal 6, coupled to the brake unit 7, and provided to front wheels 3 and rear wheels 2. An accelerator opening sensor 61 which detects the amount of the depression of the accelerator pedal 5 is provided to the accelerator pedal 5, and a break switch 62 which detects the depression of the brake pedal 6 is provided to the break pedal 6.

In addition, the electrically driven vehicle 1A is provided with a key switch 21 and a power generation switch 22. The key switch 21 and the power generation switch 22 are switches capable of switching ON and OFF selectively. The key switch 21 is an operation means for making an operation request to the electric motor 13. More specifically, when the key switch 21 is ON, the operation request is made, and when it is OFF, the operation request is not made. The power generation switch 22 is an operation means for making the operation request to the power generation device 11. More specifically, when the power generation switch 22 is ON, the operation request to the power generation device 11 is made, and when it is OFF, the operation request to the power generation device 11 is not made. The key switch 21 and the power generation switch 22 are provided to an unillustrated instrument panel.

Figure 3:
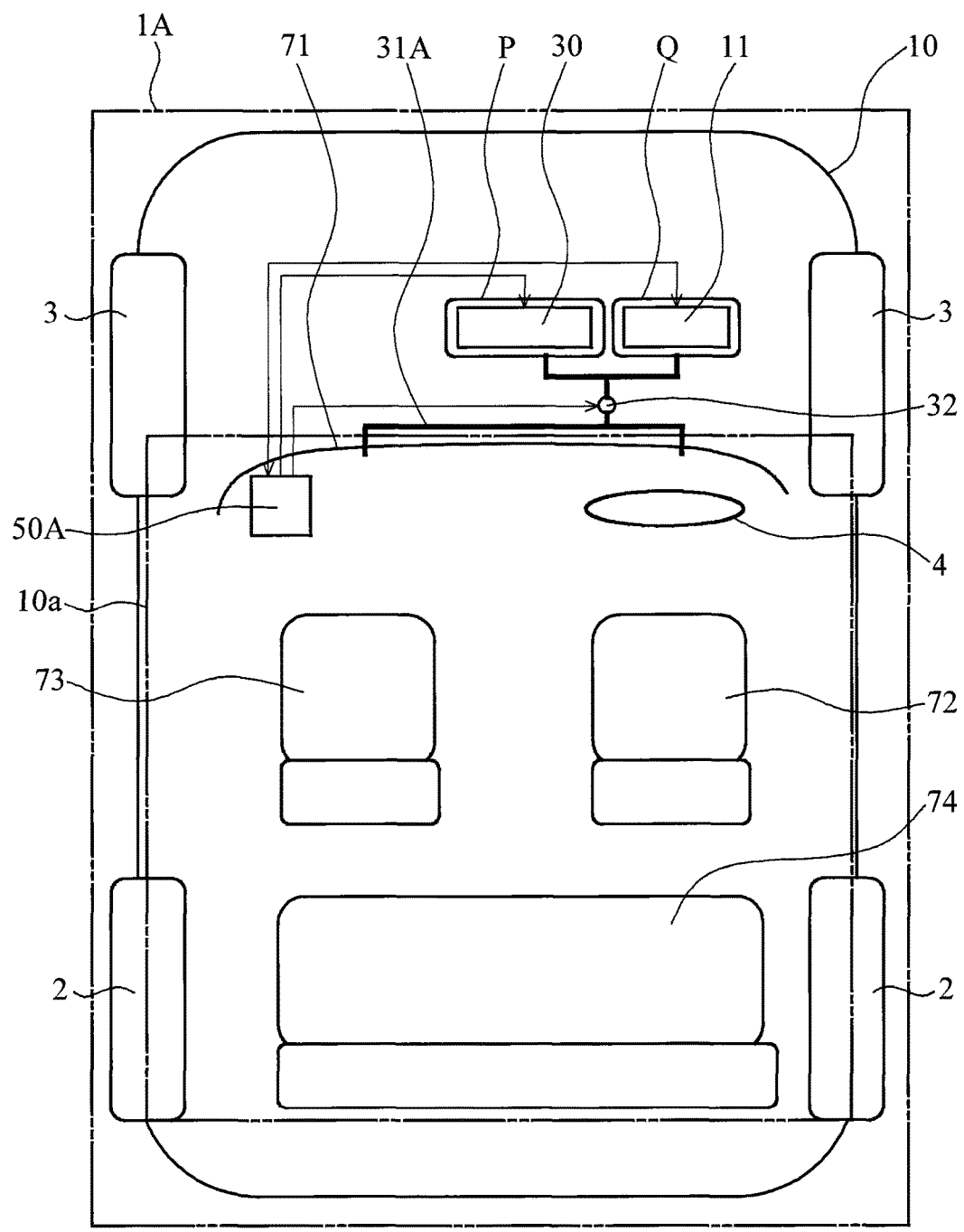
FIG. 3 is another diagrammatic configuration drawing of the electrically driven vehicle in accordance with the first embodiment.

In addition, the electrically driven vehicle 1A is provided with an electric heater 30. As illustrated in FIG. 3, both the electric heater 30 and the power generation device 11 are located outside a vehicle interior 10a. More specifically, the electric heater 30 and the power generation device 11 are located outside of the vehicle interior 10a and in the anterior area of the vehicle interior 10a in the vehicle body 10. A dash-board 71, a driver seat 72, a passenger seat 73 and a rear seat 74 are provided to the inside of the vehicle interior 10a, and more specifically, the power generation device 11 is located outside the vehicle interior 10a and in the anterior area of the foot of the driver seat 72.

The electric heater 30 is specifically mounted to a mounting part P which forms a space isolated from the surroundings. The power generation device 11 is specifically mounted to a mounting part Q, which includes an unillustrated opening/closing mechanism which enables the attachment and detachment of the power generation device 11, and forms a space isolated from the surroundings. An air inlet and outlet part, which is not illustrated, is provided to each of the mounting part P of the electric heater 30 and the mounting part Q of the power generation device 11. The air existing in the mounting part P of the electric heater 30 is warmed up by heat of the electric heater 30 which produces heat with the power distribution from the battery 12, and the air existing in the mounting part Q of the power generation device 11 is warmed up by waste heat which is heat released from the power generation device 11 in operation.

The electric heater 30 corresponds to the first air conditioning means which executes the air-conditioning operation which uses the electrical power of the battery 12, and the power generation device 11 corresponds to the second air conditioning means which is mounted to the vehicle body 10 removably and executes another air-conditioning operation other than the air-conditioning operation which uses the electrical power of the battery 12.

More specifically, both the electric heater 30 and the power generation device 11 are the air conditioning means which executes a heating operation. In addition, the power generation device 11 is specifically the air conditioning means which generates electric power by using fuel and executes the air-conditioning operation which uses waste heat in electric power generation, and more specifically, is the air conditioning means which executes the air-conditioning operation which uses heat released from the engine 111 as waste heat in electric power generation.

Each of the mounting part P of the electric heater 30 and the mounting part Q of the power generation device 11 is a heat exchange space forming part which forms the space for heat exchange in executing the air-conditioning operation. A chassis may be provided to each of the electric heater 30 and the power generation device 11, and the provided chassis may be the heat exchange space forming part, for example.

In addition, the electrically driven vehicle 1A includes a ventilation duct 31A. The ventilation duct 31A connects each of the mounting part P of the electric heater 30 and the mounting part Q of the power generation device 11 to the vehicle interior 10a in parallel. More specifically, the ventilation duct 31A includes two branching parts which are provided so as to correspond to the electric heater 30 and the power generation device 11 in one end side, and these branching parts are connected to the air outlet parts provided to the mounting part P of the electric heater 30 and the mounting part Q of the power generation device 11. The ventilation duct 31A includes a number of branching parts (here, two), which are provided so as to correspond to parts in the vehicle interior 10a (here, unillustrated blast exits provided to the dash-board 71), on another end side, and these branching parts are connected to blast exits. Two branching parts provided on one end side and a number of branching parts provided on another end side are gathered in a gathering part located in the middle of the ventilation duct 31A. The ventilation duct 31A is a guide means which guides the air which is air-conditioned by the electric heater 30 and the power generation device 11.

The electrically driven vehicle 1A further includes a blast fan 32. The blast fan 32 is provided to the ventilation duct 31A so as to blow the air toward the vehicle interior 10a. The blast fan 32 is specifically provided to the gathering part of the ventilation duct 31A. Thus, the air is firstly introduced into the mounting part P of the electric heater 30 and the mounting part Q of the power generation device 11 through the air inlet part by the blast fan 32, is warmed up by the power generation device 11 and the electric heater 30, and is blown into the vehicle interior 10a from the mounting part P of the electric heater 30 and the mounting part Q of the power generation device 11 through the ventilation duct 31A. The blast fan 32 is the blast means which blows the air air-conditioned by the electric heater 30 and the power generation device 11, and, more specifically, is the blast means common to the electric heater 30 and the power generation device 11 in the electrically driven vehicle 1A.

In addition, the electrically driven vehicle 1A includes a vehicle-side ECU 50A which corresponds to a first control device. The vehicle-side ECU 50A includes a microcomputer comprised of unillustrated CPU, ROM, RAM and the like and an input/output circuit. The power-generation-device-side ECU 113, which corresponds to a second control device, has a similar structure. The power generation device 11 (more specifically, the power-generation-device-side ECU 113) is electrically and removably connected to the vehicle-side ECU 50A. Specifically, the vehicle-side ECU 50A and the power generation device 11 are connected via a low voltage wiring which is a wiring for a control system.

As illustrated in FIG. 1 and FIG. 3, various types of controlled objects such as the electric motor 13, the electric heater 30 and the blast fan 32 are electrically connected to the vehicle-side ECU 50A, and various types of sensors and switches such as the key switch 21, the power generation switch 22, an air conditioning switch 23, a temperature adjustment switch 24, the accelerator opening sensor 61, the break switch 62 and a mount detection sensor 63 are electrically connected to the vehicle-side ECU 50A, the air conditioning switch 23 being able to switch ON and OFF of the air conditioning, the temperature adjustment switch 24 being able to adjust the air-conditioning temperature, and the mount detection sensor 63 being a state detection means capable of detecting the mount/unmount of the power generation device 11 by detecting the power generation device 11 which is in mounted state. Further, the battery 12 is electrically connected to the vehicle-side ECU 50A to detect the amount of charge of the battery.

The ROM is a composition for storing programs in which various processes executed by the CPU are written and map data. In the power-generation-device-side ECU 113, a control means, a determination means, a detection means, a calculation means and the like are functionally achieved by the execution of processes by the CPU based on the program stored in the ROM with using the temporary storage region of the RAM as necessary.

For example, in the vehicle-side ECU 50A, an air conditioning change means, which changes at least one of use states of the electric heater 30 and the power generation device 11, is functionally achieved.

When changing the use state, the air conditioning change means may change the use state in accordance with the usage state or usage conditions of the vehicle, for example.

In addition, when changing the use state, the air conditioning change means adjusts at least one of air-conditioning capacities of the electric heater 30 and the power generation device 11 separately, switches the air conditioning means to be used between the electric heater 30 and the power generation device 11, and adjusts the use ratio between the electric heater 30 and the power generation device 11.

More specifically, in the vehicle-side ECU 50A, the air conditioning change means changes the air conditioning means to be used between the electric heater 30 and the power generation device 11.

In addition, more specifically, in the vehicle-side ECU 50A, the air conditioning change means switches the air conditioning means to be used in accordance with whether the electric power generation by the power generation device 11 is possible.

The air conditioning change means can change the use state not only when the air conditioning switch 23 is already ON, but also when the air conditioning switch 23 is OFF. That is to say that the use state changed by the air conditioning change means includes the state where it is being used and the state where it is to be used.

In addition, in the vehicle-side ECU 50A, a diagnosis means, which diagnoses whether the power generation device 11 is able to generate electric power, is functionally achieved, for example.

More specifically, when diagnosing whether the power generation device 11 is able to generate electric power, the diagnosis means diagnoses the state wherein the electric power generation by the power generation device 11 is possible.

The diagnosis means can diagnose the state wherein the electric power generation by the power generation device 11 is possible by determining whether the power generation device 11 is mounted or not, for example.

In addition, the diagnosis means may diagnose the state wherein the electric power generation by the power generation device 11 is possible, by determining whether unillustrated interlock device (e.g. a fixation check device of the power generation device 11, or a lock check device of an opening/closing mechanism provided to mounting part Q of the power generation device 11), which is provided to detect whether the mount state of the power generation device 11 is a normal state, detects a normal state; whether the amount of fuel of the power generation device 11 is enough (more than a given amount); whether the electrical connection state of the power generation device 11 is not abnormal; whether the mechanical connection state of the power generation device 11 is not abnormal; or whether the power generation device 11 does not have abnormality such as a failure, or executing the composite of above determinations arbitrarily.

More specifically, the diagnosis means may diagnose the state wherein the electric power generation by the power generation device 11 is possible by determining the composite of a number of determinations.

Specifically, the diagnosis means determines that the power generation device 11 is able to generate electric power when the diagnosis means executes the determination by composing above determinations, and determines that the power generation device 11 is mounted, the interlock device detects the normal state, the amount of the fuel of the power generation device 11 is more than a given amount, the electrical and mechanical connection state of the power generation device 11 is not abnormal, and the power generation device 11 does not have an abnormality as a result of the composite determination.

On the other hand, when diagnosing the state wherein the electric power generation by the power generation device 11 is possible by using a number of determinations, the diagnosis means may include the determination whether the power generation device 11 is mounted or not as a fundamental determination, for example. However, not limited to this, the diagnosis means may determine whether the power generation device 11 is mounted indirectly by including the determination whether the electrical and mechanical connection state of the power generation device 11 is abnormal as the fundamental determination.

Figure 4:
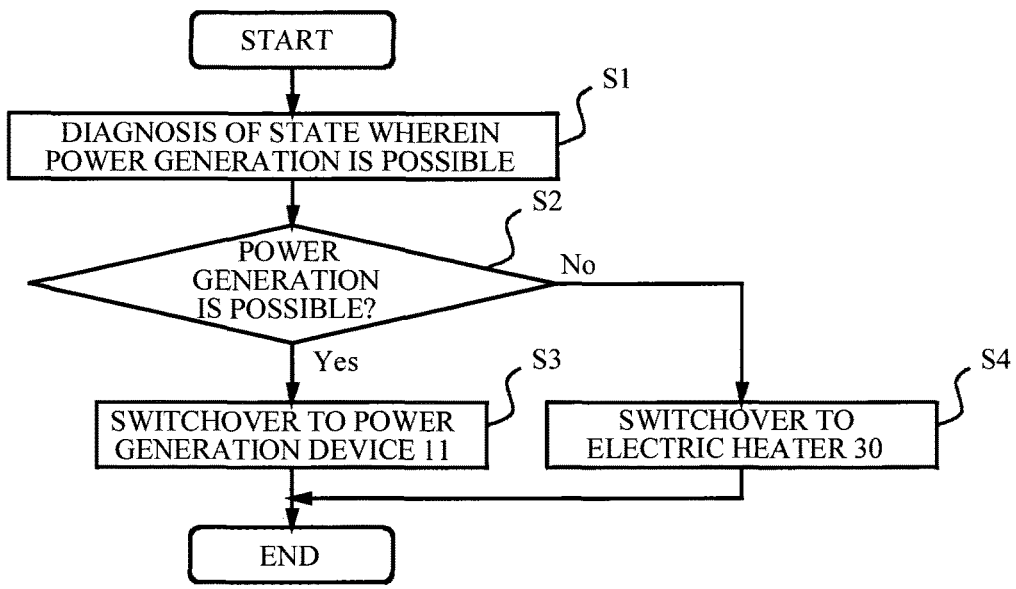
FIG. 4 is a flowchart illustrating an operation of a vehicle-side ECU (Electronic Control Unit) in accordance with the first embodiment.

A description will now be given of an operation of the vehicle-side ECU 50A with reference to a flowchart illustrated in FIG. 4. The vehicle-side ECU 50A diagnoses the state wherein the electric power generation by the power generation device 11 is possible (step S1), and thereby determines whether the power generation device 11 is able to generate electric power (step S2). When the determination is Yes, the vehicle-side ECU 50A switches the air conditioning means to be used to the power generation device 11 (step S3). This makes the power generation device 11 become the air conditioning means to be used. On the other hand, the determination of the step S2 is No, the vehicle-side ECU 50A switches the air conditioning means to be used to the electric heater 30 (step S4). This makes the electric heater 30 become the air conditioning means to be used.

A description will now be given of advantages of the electrically driven vehicle 1A. Here, the electrically driven vehicle 1A removably equips the power generation device 11, which executes another air-conditioning operation other than the air-conditioning operation which uses the electrical power of the battery. Therefore, the electrically driven vehicle 1A can execute the air-conditioning operation without consuming the battery power by executing the air-conditioning operation with the power generation device 11, and therefore this enables to ensure the cruising distance of the vehicle. In addition, the electrically driven vehicle 1A can suppress the decrease in energy efficiency due to the increase of the weight, by unmounting the power generation device 11.

On the other hand, the electrically driven vehicle 1A includes the electric heater 30 in addition to the power generation device 11. According to this, the electrically driven vehicle 1A ensures the properness of the use of the air conditioning from various view by changing the use states of the electric heater 30 and the power generation device 11 in accordance with the usage state or usage conditions of the vehicle.

Specifically, the electrically driven vehicle 1A switches the air conditioning means to be used between the electric heater 30 and the power generation device 11 in accordance with the determination whether the power generation device 11 is able to generate electric power. According to this, the electrically driven vehicle 1A can execute the air-conditioning operation without consuming the battery power by executing the air-conditioning operation with the power generation device 11, when the power generation device 11 is able to generate electric power. In addition, the electrically driven vehicle 1A can execute the air-conditioning operation with the electric heater 30 in a case where the power generation device 11 is not able to generate power such as a case where the power generation device 11 is not mounted. Therefore, the electrically driven vehicle 1A can ensure the properness of the use of the air conditioning because it ensures the cruising distance of the vehicle and improves the convenience.

In addition, in the electrically driven vehicle 1A, the power generation device 11 is located outside the vehicle interior 10a and in the anterior area of the foot of the driver seat 72 in the vehicle body 10. Therefore, the electrically driven vehicle 1A can effectively warm up the driver seat 72, which is used most frequently, with heat released from the power generation device 11 which is transferred from the outside of the vehicle interior 10a to the inside of the vehicle interior 10a.

In addition, in the electrically driven vehicle 1A, the power generation device 11, which executes another air-conditioning operation other than the air conditioning which uses the battery power, generates electric power by using fuel, and executes the air-conditioning operation which uses waste heat in electric power generation. Therefore, the electrically driven vehicle 1A is preferable in that it can increase the efficiency in energy use by co-generation when executing the air-conditioning operation other than the air-conditioning operation which uses the battery power.

Second Embodiment

An electrically driven vehicle 1B in accordance with the present embodiment is practically same as the electrically driven vehicle 1A, except that a vehicle-side ECU 50B is provided instead of the vehicle-side ECU 50A. Therefore, the illustration of the electrically driven vehicle 1B is omitted.

The vehicle-side ECU 50B is practically same as the vehicle-side ECU 50A, except that the air conditioning change means is achieved as described hereinafter.

In the vehicle-side ECU 50B, when changing the use state, the air conditioning change means adjusts the use ratio between the electric heater 30 and the power generation device 11.

When adjusting the use ratio, the air conditioning change means specifically adjusts the use ratio in accordance with the amount of charge of the battery 12. The air conditioning change means, which adjusts the use ratio, executes the air-conditioning operation with the electric heater 30 and the power generation device 11 simultaneously.

In addition, the air conditioning change means specifically adjusts the use ratio such that the higher the amount of charge of the battery 12 is, the higher the use ratio of the electric heater 30 becomes.

The use ratio of the electric heater 30 can be 0% at minimum and 100% at maximum for example. However, not limited to this, the use ratio of the electric heater 30 can be more than 0% at minimum and less than 100% at maximum for example.

Figure 5:
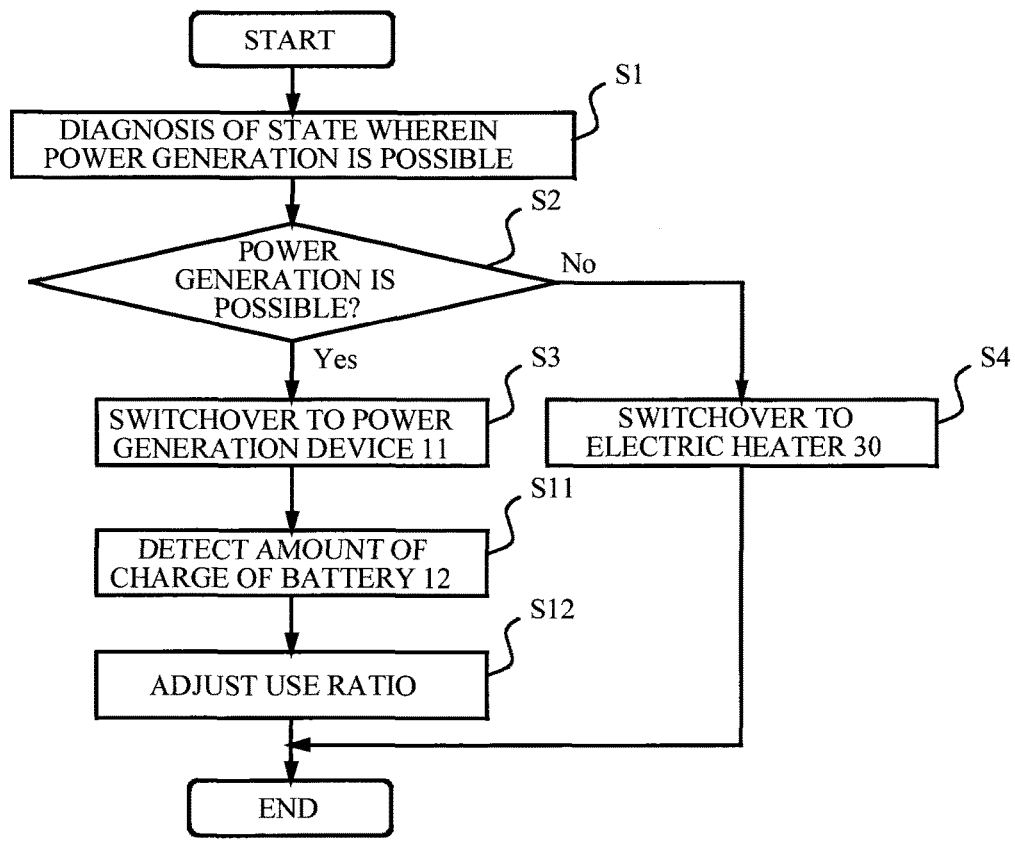
FIG. 5 is a diagram illustrating an adjustment switch.

A description will now be given of an operation of the vehicle-side ECU 50B with reference to a flowchart illustrated in FIG. 5. This flowchart is practically same as the flowchart illustrated in FIG. 4, except that steps S11 and S12 are added. Therefore, here, a description will be given of these steps especially. Subsequent to the step S3, the vehicle-side ECU 50B detects the amount of charge of the battery 12 (step S11). Then, the vehicle-side ECU 50B adjusts the use ratio in accordance with the detected amount of charge of the battery 12 (step S12).

A description will now be given of advantages of the electrically driven vehicle 1B. The electrically driven vehicle 1B adjusts the use ratio between the electric heater 30 and the power generation device 11 when changing the use state. Therefore, the electrically driven vehicle 1B can suppress the fluctuation of the air-conditioning capacity compared to the case where the air-conditioning capacities of the electric heater 30 and the power generation device 11 are adjusted separately.

The electrically driven vehicle 1B adjusts the use ratio so that the higher the amount of charge of the battery 12 is, the higher the use ratio of the electric heater 30 becomes. According to this, the electrically driven vehicle 1B can prevent the over charge of the battery 12, and reduce the fuel consumption of the power generation device 11.

On the other hand, the electrically driven vehicle 1B adjusts the use ratio so that the less the amount of charge of the battery 12 is, the less the use ratio of the electric heater 30 becomes. According to this, the electrically driven vehicle 1B ensures the cruising distance of the vehicle because it can reduce the consumption of the electrical power of the battery 12 and promote the charge of the battery 12. Therefore, the electrically driven vehicle 1B can ensure the properness of the use of the air conditioning because it can execute an economic and balanced air-conditioning operation between the electric heater 30 and the power generation device 11.

Third Embodiment

Figure 6:
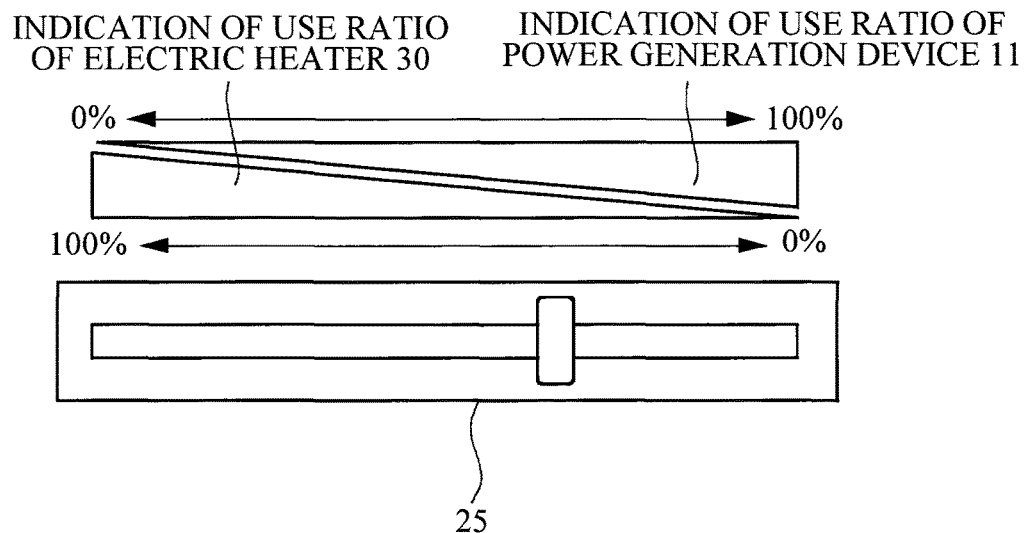
FIG. 6 is a flowchart illustrating an operation of a vehicle-side ECU in accordance with a second embodiment.

An electrically driven vehicle 1C in accordance with the present embodiment is practically same as the electrically driven vehicle 1A, except that an adjustment switch 25 illustrated in FIG. 6 is further provided, and a vehicle-side ECU 50C is provided instead of the vehicle-side ECU 50A. Thus, the illustration of the electrically driven vehicle 1C is omitted.

The adjustment switch 25 is provided to the unillustrated instrument panel. The adjustment switch 25 is an operation means capable of adjusting the use ratio between the power generation device 11 and the electric heater 30. Specifically, the adjustment switch 25 is configured so as to adjust the use ratio of the electric heater 30 (in other words, the power generation device 11) arbitrarily from 0% to 100%. However, not limited to this, the use ratio of the electric heater 30 can be more than 0% at minimum and less than 100% at maximum for example. In addition, the operation means, which can adjust the use ratio between the power generation device 11 and the electric heater 30, may be configured so as to be able to adjust the use ratio gradually.

The vehicle-side ECU 50C is practically same as the vehicle-side ECU 50A, except that the adjustment switch 25 is further electrically connected, and the air conditioning change means adjusts the use ratio between the electric heater 30 and the power generation device 11 in accordance with the state of the adjustment switch 25 when changing the use state. The air conditioning change means, which adjusts the use ratio, executes the air-conditioning operation with the electric heater 30 and the power generation device 11 simultaneously when the power generation device 11 is able to generate electric power.

Figure 7:
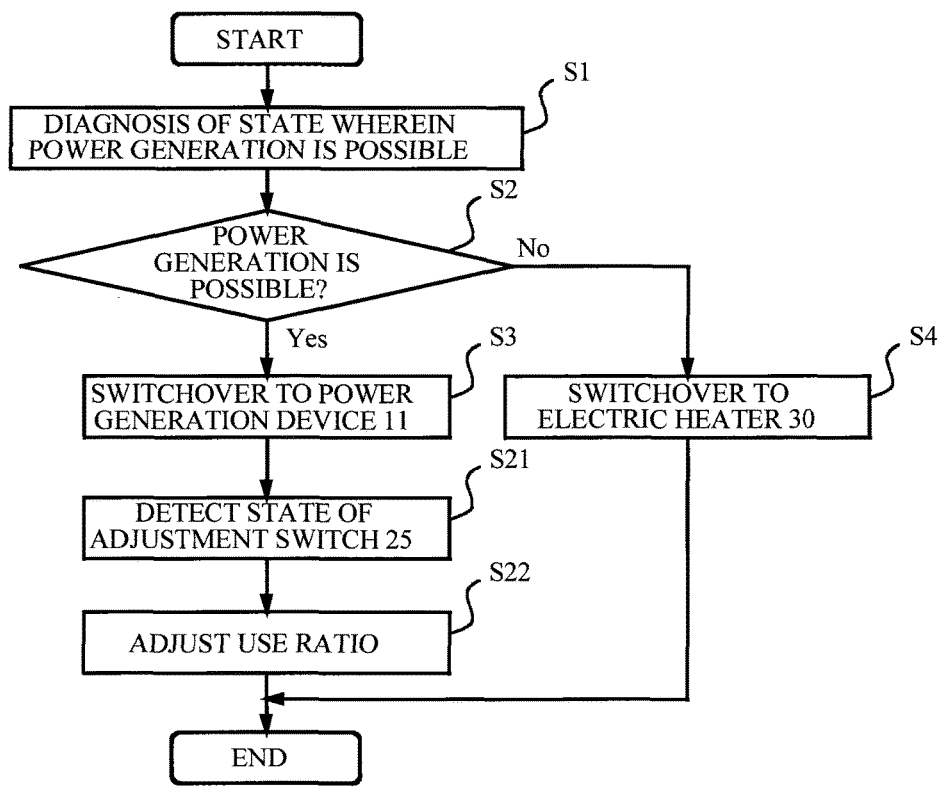
FIG. 7 is a flowchart illustrating an operation of a vehicle-side ECU in accordance with a third embodiment.

A description will now be given of an operation of the vehicle-side ECU 50C with reference to a flowchart illustrated in FIG. 7. This flowchart is practically same as the flowchart illustrated in FIG. 4, except that steps S21 and S22 are added. Therefore, the description will be given of especially these steps. Subsequent to the step S3, the vehicle-side ECU 50C detects the state of the adjustment switch 25 (step S21). Then, the vehicle-side ECU 50C adjusts the use ratio in accordance with the state of the adjustment switch 25 (step S22).

A description will now be given of advantages of the electrically driven vehicle 1C. Here, it is considered that there will be a case where the vehicle can travel home or to the electricity station which has the charging facility even though the air-conditioning operation which uses the battery power is executed, as the usage conditions of the vehicle which executes the air-conditioning operation. In this case, it is considered that there may be a case where the user wants to execute the air-conditioning operation with the electric heater 30 because the user wants to reduce the fuel consumption of the power generation device 11 even though the power generation device 11 is able to generate electric power.

On this matter, the electrically driven vehicle 1C can execute the air-conditioning operation which uses only the electric heater 30 or which uses the electric heater 30 concurrently, by adjusting the use ratio by the adjustment switch 25 even though the power generation device 11 is able to generate electric power. In this case, the air-conditioning operation can be executed with reducing the fuel consumption by the power generation device 11.

In addition, the electrically driven vehicle 1C reduces the consumption of the electrical power of the battery by decreasing the use ratio of the electric heater 30 when the cruising distance of the vehicle is estimated to be long, and thereby can ensure the cruising distance of the vehicle.

Thus, the electrically driven vehicle 1C can ensure the properness of the use of the air conditioning because it can execute the proper air-conditioning operation in accordance with the usage conditions of the vehicle.

Fourth Embodiment

Figure 8:
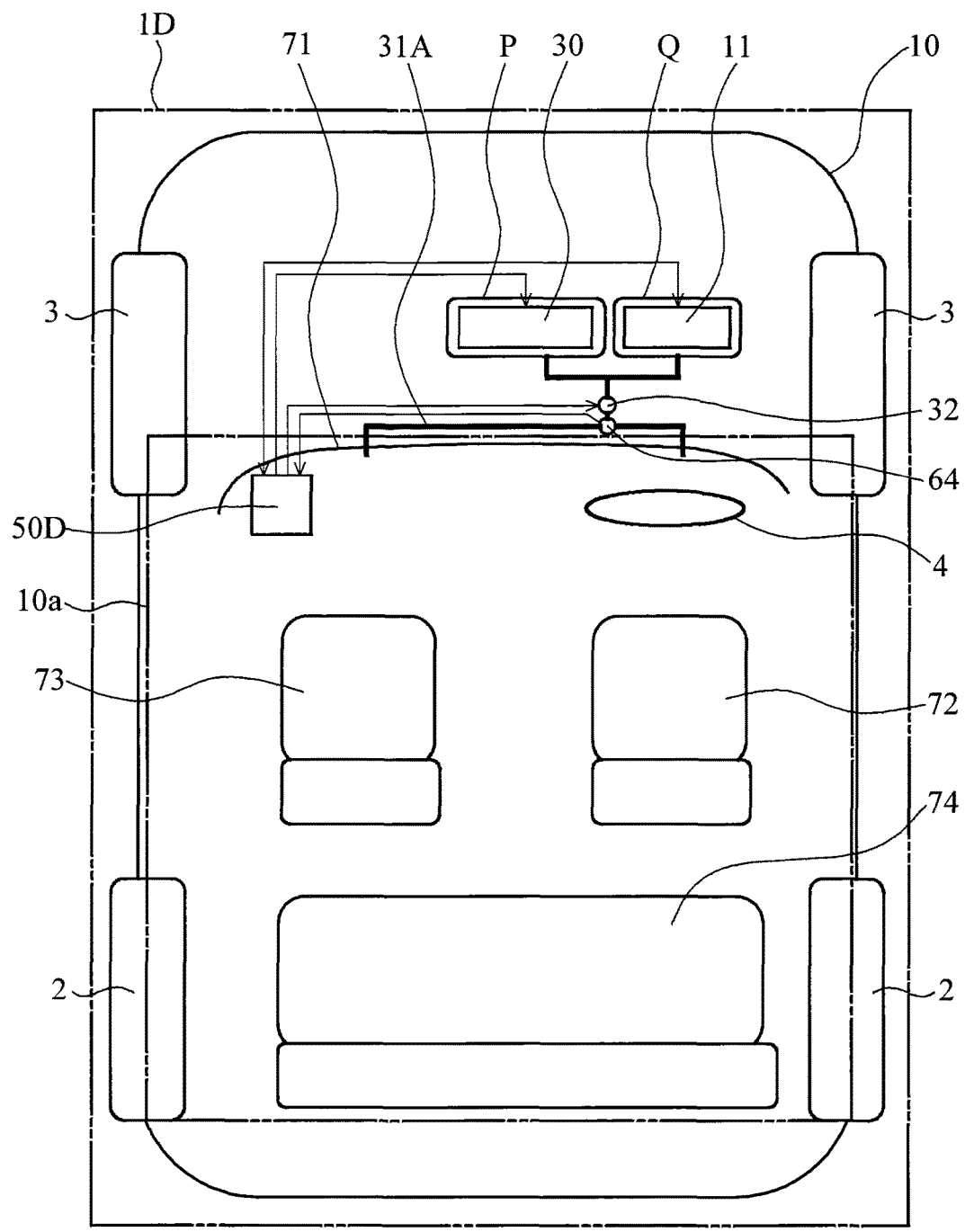
FIG. 8 is a diagrammatic configuration drawing of an electrically driven vehicle in accordance with a fourth embodiment.

As illustrated in FIG. 8, an electrically driven vehicle 1D in accordance with the present embodiment is practically same as the electrically driven vehicle 1A, except that a temperature sensor 64 is further provided, and a vehicle-side ECU 50D is provided instead of the vehicle-side ECU 50A. Similar modification can be applied to the electrically driven vehicle 1B and 1C for example.

The temperature sensor 64 is located downstream of the mounting part P of the electric heater 30 and the mounting part Q of the power generation device 11 in the ventilation duct 31A. Thus, the temperature sensor 64 is located downstream of the part where two branching parts provided on the one end side are gathered. Specifically, the temperature sensor 64 is provided to the gathering part of the ventilation duct 31A, and more specifically, is located in the part which is located most downstream side (here, specifically, the part where a number of branching parts provided on another end side are gathered). The temperature sensor 64 located as described is a detection means capable of detecting the temperature of the air-conditioned air by detecting the temperature of the gathering part of the ventilation duct 31A.

The vehicle-side ECU 50D is practically same as the vehicle-side ECU 50A, except that the temperature sensor 64 is further electrically connected, and the air conditioning change means is achieved as described hereinafter.

In the vehicle-side ECU 50D, when changing the use state, the air conditioning change means adjusts the air-conditioning capacity of the air conditioning means to be used based on the temperature of the gathering part and a requested temperature which is the target temperature set for executing the air-conditioning operation.

Specifically, the air conditioning change means makes the air-conditioning capacity of the air conditioning means relatively higher than that of a case where the temperature of the gathering part is higher than the requested temperature, when the temperature of the gathering part is lower than the requested temperature. In addition, the air conditioning change means makes the air-conditioning capacity of the air conditioning means to be used relatively lower than that of a case where the temperature of the gathering part is lower than the requested temperature, when the temperature of the gathering part is higher than the requested temperature.

The air conditioning change means adjusts the air-conditioning capacity of the air conditioning means to be used based on the temperature of the gathering part and the requested temperature when executing the air-conditioning operation.

The requested temperature can be set with the temperature adjustment switch 24.

Figure 9:
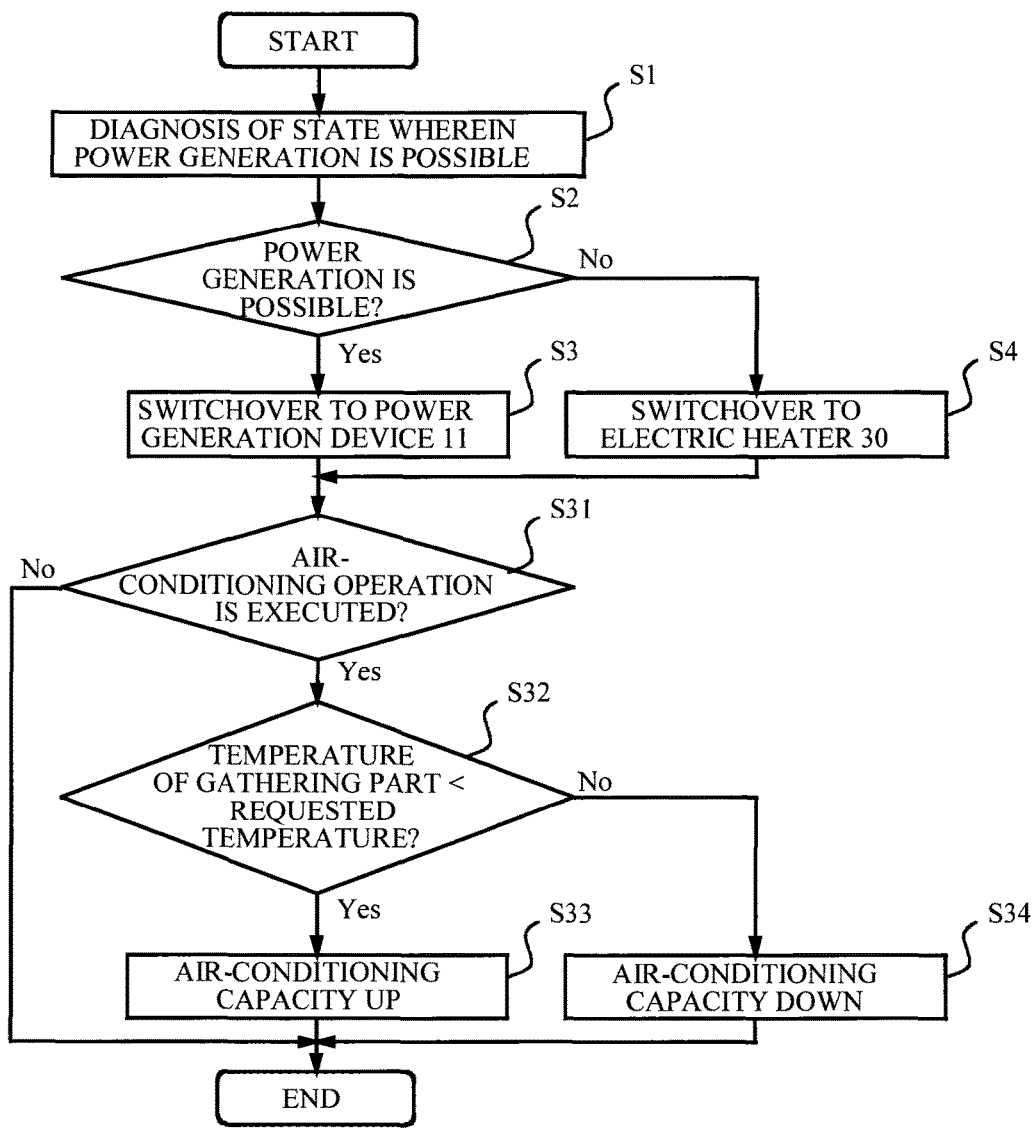
FIG. 9 is a flowchart illustrating an operation of the vehicle-side ECU in accordance with the fourth embodiment.

A description will now be given of an operation of the vehicle-side ECU 50D with reference to a flowchart illustrated in FIG. 9. This flowchart is same as the flowchart illustrated in FIG. 4, except that steps S31 through S34 are added. Therefore, a description will be given of especially these steps. Subsequent to the step S3 or the step S4, the vehicle-side ECU 50D determines whether the air-conditioning operation is executed based on the output of the air conditioning switch 23 (step S31). When the determination is No, this flowchart is terminated. On the other hand, when the determination of the step S31 is Yes, the vehicle-side ECU 50D determines whether the temperature of the gathering part is lower than the requested temperature (step S32). When the determination is Yes, the vehicle-side ECU 50D relatively increases the air-conditioning capacity of the air conditioning means to be used (the air-conditioning capacity UP) in a step S33. On the other hand, when the determination of a step S32 is No, the vehicle-side ECU 50D relatively decreases the air-conditioning capacity of the air conditioning means to be used (the air-conditioning capacity DOWN) in a step S34.

A description will now be given of advantages of the electrically driven vehicle 1D. In the electrically driven vehicle 1D, the temperature sensor 64 is located downstream of the part where two branching parts provided to one end side are gathered in the ventilation duct 31A. According to this, the electrically driven vehicle 1D can adjust the air-conditioning capacity with the single temperature sensor 64 in both cases where the air-conditioning means to be used is the electric heater 30 or the power generation device 11 and where the air conditioning means to be used is the electric heater 30 and the power generation device 11, when executing the air-conditioning operation. Therefore, according to this, the electrically driven vehicle 1D can ensure the properness of the use of the air conditioning because the control and the structure can be simplified.

Fifth Embodiment

Figure 10:
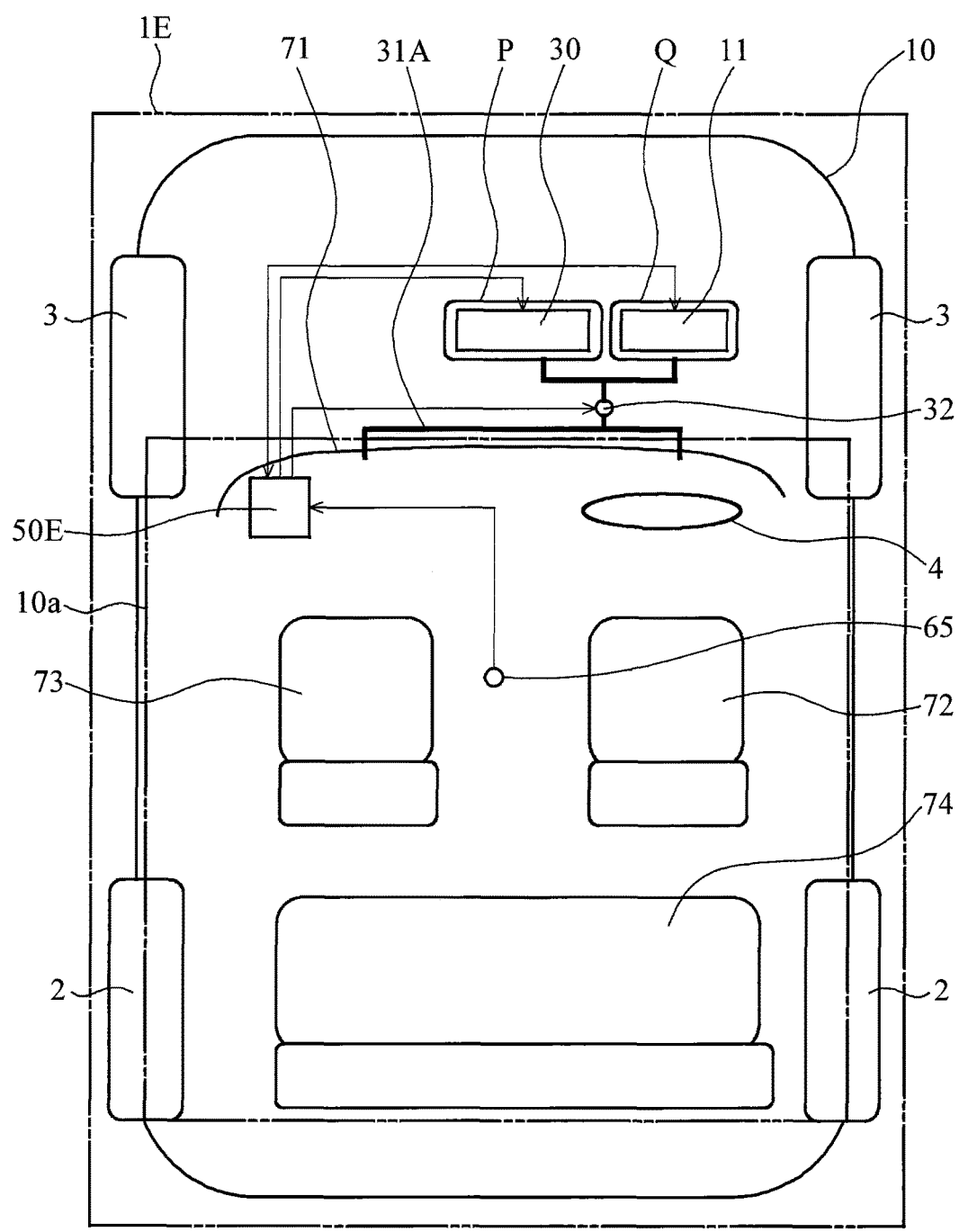
FIG. 10 is a diagrammatic configuration drawing of an electrically driven vehicle in accordance with a fifth embodiment.

As illustrated in FIG. 10, an electrically driven vehicle 1E in accordance with the present embodiment is practically same as the electrically driven vehicle 1B, except that a room temperature sensor 65 is further provided, and a vehicle-side ECU 50E is provided instead of the vehicle-side ECU 50B. Similar modification can be applied to the electrically driven vehicle 1C.

The room temperature sensor 65 is provided to the vehicle interior 10a, and is a detection means which can detect an actual temperature inside of the vehicle interior 10a by detecting the room temperature.

The vehicle-side ECU 50E is practically same as the vehicle-side ECU 50B, except that the room temperature sensor 65 is electrically connected, and the air conditioning change means is achieved as described hereinafter.

In the vehicle-side ECU 50E, when changing the use state, the air conditioning change means adjusts the air-conditioning capacity of the electric heater 30 so that the air-conditioning capacity is decreased in a case where the difference between the requested temperature and the room temperature is small in a state where at least the electric heater 30 executes the air-conditioning operation.

When adjusting the air-conditioning capacity of the electric heater 30 so that the air-conditioning capacity is decreased, the air conditioning change means stops the operation of the electric heater 30 by stopping the power supply to the electric heater 30.

In addition, more specifically, the air conditioning change means stops the operation of the electric heater 30 when the difference between the requested temperature and the room temperature is smaller than a given value $\alpha$ in a state where the electric heater 30 and the power generation device 11 execute the air-conditioning operation simultaneously.

In addition, in the vehicle-side ECU 50E, the air conditioning change means adjusts the air-conditioning capacity of the air conditioning means to be used based on the room temperature and the requested temperature. Specifically, when the room temperature is lower than the requested temperature, the air conditioning change means makes the air-conditioning capacity of the air conditioning means to be used become relatively higher than that of the case where the room temperature is equal to or higher than the requested temperature. In addition, when the room temperature is equal to or higher than the requested temperature, the air conditioning change means makes the air-conditioning capacity of the air conditioning means to be used become relatively lower than that of the case where the room temperature is lower than the requested temperature.

When executing the air-conditioning operation, the air conditioning change means adjusts the air-conditioning capacity of the air conditioning means to be used based on the room temperature and the requested temperature.

Figure 11:
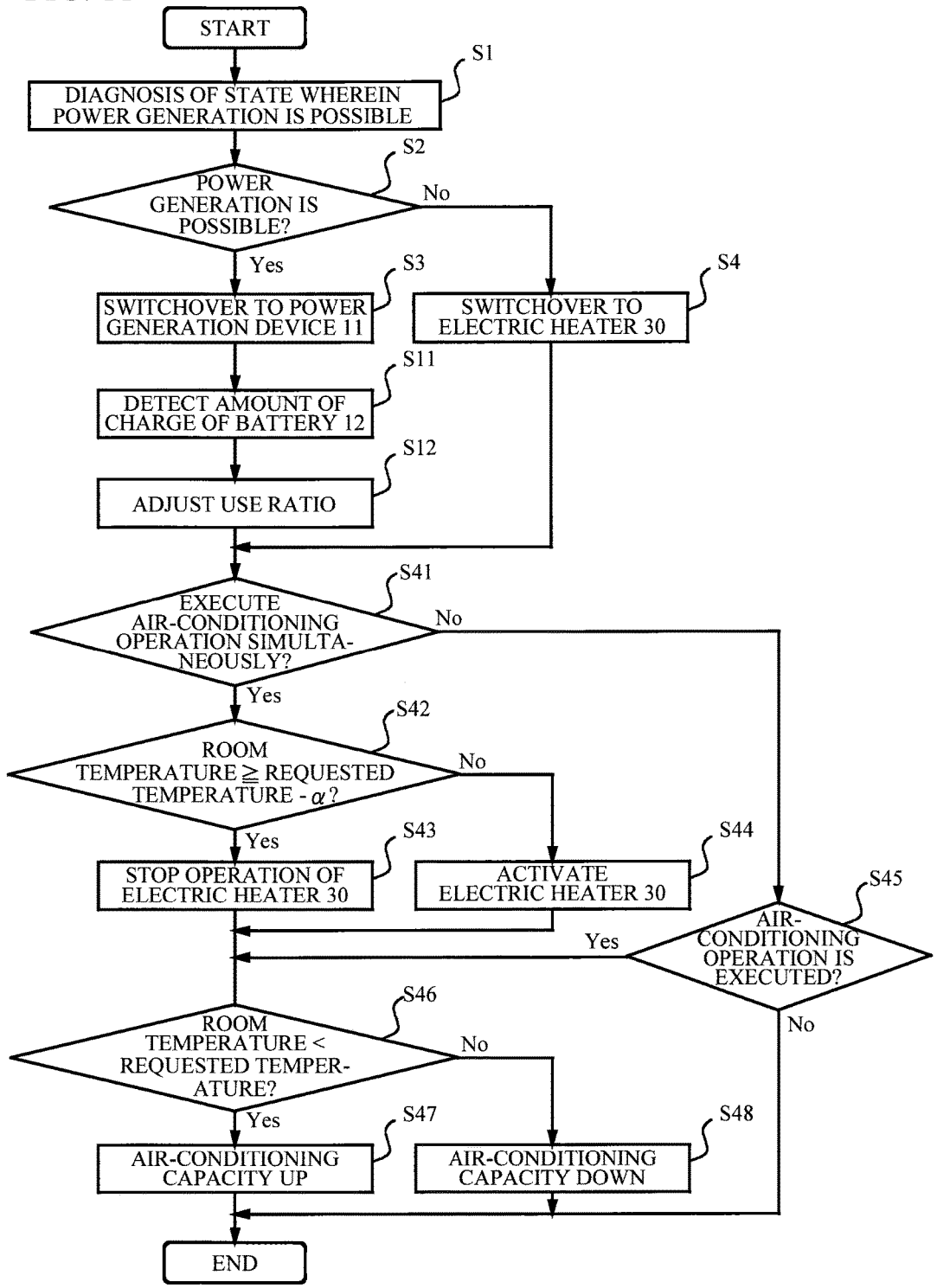
FIG. 11 is a flowchart illustrating an operation of the vehicle-side ECU in accordance with the fifth embodiment.

A description will now be given of the operation of the vehicle-side ECU 50E with reference to a flowchart illustrated in FIG. 11. This flowchart is same as the flowchart illustrated in FIG. 5, except that steps S41 through S48 are added. Thus, a description will be given of especially these steps. Subsequent to the step S12, the vehicle-side ECU 50E determines whether the electric heater 30 and the power generation device 11 execute the air-conditioning operation simultaneously (step S41). When the determination is Yes, the vehicle-side ECU 50E determines whether the room temperature is equal to or greater than the value calculated by subtracting a given value $\alpha$ from the requested temperature (step S42). In this step, it is determined whether the difference between the requested temperature and the room temperature is smaller than a given value $\alpha$. When the determination of the step S42 is No, the vehicle-side ECU 50E activates the electric heater 30 (step S44). When the electric heater 30 is already activated, the operation of the electric heater 30 is continued in this step. On the other hand, when the determination of the step S42 is Yes, the vehicle-side ECU 50E stops the operation of the electric heater 30 (step S44). On the other hand, when the determination of the step S41 is No, the vehicle-side ECU 50E determines whether the air-conditioning operation is executed (step S45). When the determination is No, this flowchart is terminated.

Subsequent to steps S43 and S44, or when the determination of the step S45 is Yes, the vehicle-side ECU 50E determines whether the room temperature is lower than the requested temperature (step S46). When the determination is Yes, the vehicle-side ECU 50E relatively increases the air-conditioning capacity of the air conditioning means to be used in the step S47 (the air-conditioning capacity UP). Specifically, the vehicle-side ECU 50E relatively increases the air-conditioning capacity of the power generation device 11 in this step when the process moves to the step S46 after the step S43.

On the other hand, when the determination of the step S46 is No, the vehicle-side ECU 50E relatively decreases the air-conditioning capacity of the air conditioning means to be used in the step S48 (the air-conditioning capacity DOWN). Specifically, the vehicle-side ECU 50E relatively decreases the air-conditioning capacity of the power generation device 11 in this step when the process moves to the step S46 after the step S43. The air-conditioning capacity of the power generation device 11 can be relatively decreased by reducing the generated heat of the power generation device 11 or lowering the output of the blast fan 32.

A description will now be given of advantages of the electrically driven vehicle 1E. In the electrically driven vehicle 1E, the operation of the electric heater 30 is stopped when the difference between the requested temperature and the room temperature is smaller than a given value $\alpha$. That is to say that in the electrically driven vehicle 1E, the operation of the electric heater 30 is stopped in a state where the room temperature is close to the requested temperature to some extent. Unlike the case where the temperature of the gathering part is used as described in the fourth embodiment for example, in the electrically driven vehicle 1E, when stopping the operation of the electric heater 30, it is possible to detect whether the room temperature is actually close to the requested temperature to some extent by using the actual temperature inside of the vehicle interior 10a. Thus, the electrically driven vehicle 1E can suppress the great decrease in air-conditioning performance due to the stop of the operation of the electric heater 30 in a state where the room temperature is not close to the requested temperature to some extent.

On the other hand, the electrically driven vehicle 1E can continue the air-conditioning operation with the power generation device 11 even when the operation of the electric heater 30 is stopped. Thus, the electrically driven vehicle 1E can reduce the consumption of the electrical power of the battery 12 by the electric heater 30 when continuing the air-conditioning operation in a state where the room temperature is close to the requested temperature to some extent. Thus, the electrically driven vehicle 1E can ensure the properness of the use of the air conditioning because it can fully secures the air-conditioning performance and further ensure the cruising distance of the vehicle compared to the case where the air-conditioning operation with the electric heater 30 is continued.

The air conditioning change means may stop the operation of the electric heater 30 when the difference between the requested temperature and the room temperature is smaller than a given value $\alpha$ not in a state where the electric heater 30 and the power generation device 11 execute the air-conditioning operation simultaneously, but in a state where the power generation device 11 is able to generate electric power and the electric heater 30 out of the electric heater 30 and the power generation device 11 executes the air-conditioning operation. In this case, it is possible to continue the air-conditioning operation by achieving the air conditioning change means to stop the operation of the electric heater 30 and to start the operation of the power generation device 11. In this case, when the air-conditioning operation is continued in a state where the room temperature is close to the requested temperature to some extent, it is also possible to reduce the consumption of the electrical power of the battery 12 by the electric heater 30.

On the other hand, in this case, there is a possibility that the air-conditioning performance is temporarily decreased in accordance with the warm-up state of the power generation device 11 (more specifically, the engine 111) for example. Therefore, in this case, the air conditioning change means may start the operation of the power generation device 11 when the difference between the requested temperature and the room temperature is smaller than a given value β, which is greater than the given value α, in a state where the power generation device 11 is able to execute electric power and the electric heater 30 out of the electric heater 30 and the power generation device 11 executes the air-conditioning operation for example. According to this, it becomes possible to suppress the temporary decrease in air-conditioning performance because it is possible to promote warming up the power generation device 11 in advance.

In addition, the air conditioning change means may adjust the air-conditioning capacity of the electric heater 30 without stopping the operation of the electric heater 30 so that the air-conditioning capacity is decreased, for example. According to this, when the air-conditioning operation is continued in a state where the room temperature is close to the requested temperature to some extent, it is possible to suppress the consumption of the power of the battery 12 by the electric heater 30.

In addition, the air conditioning change means may adjust the use ratio instead of stopping the operation of the electric heater 30 so that the use ratio of the electric heater 30 is decreased. In this case, the generated heat of the power generation device 11 increases because the use ratio of the power generation device 11 is increased, and as a result, it is preferable in that compared to the case where the generated heat of the power generation device 11 is not particularly changed, the room temperature can reach the requested temperature more quickly and that the charge of the battery 12 can be further promoted.

Sixth Embodiment

Figure 12:
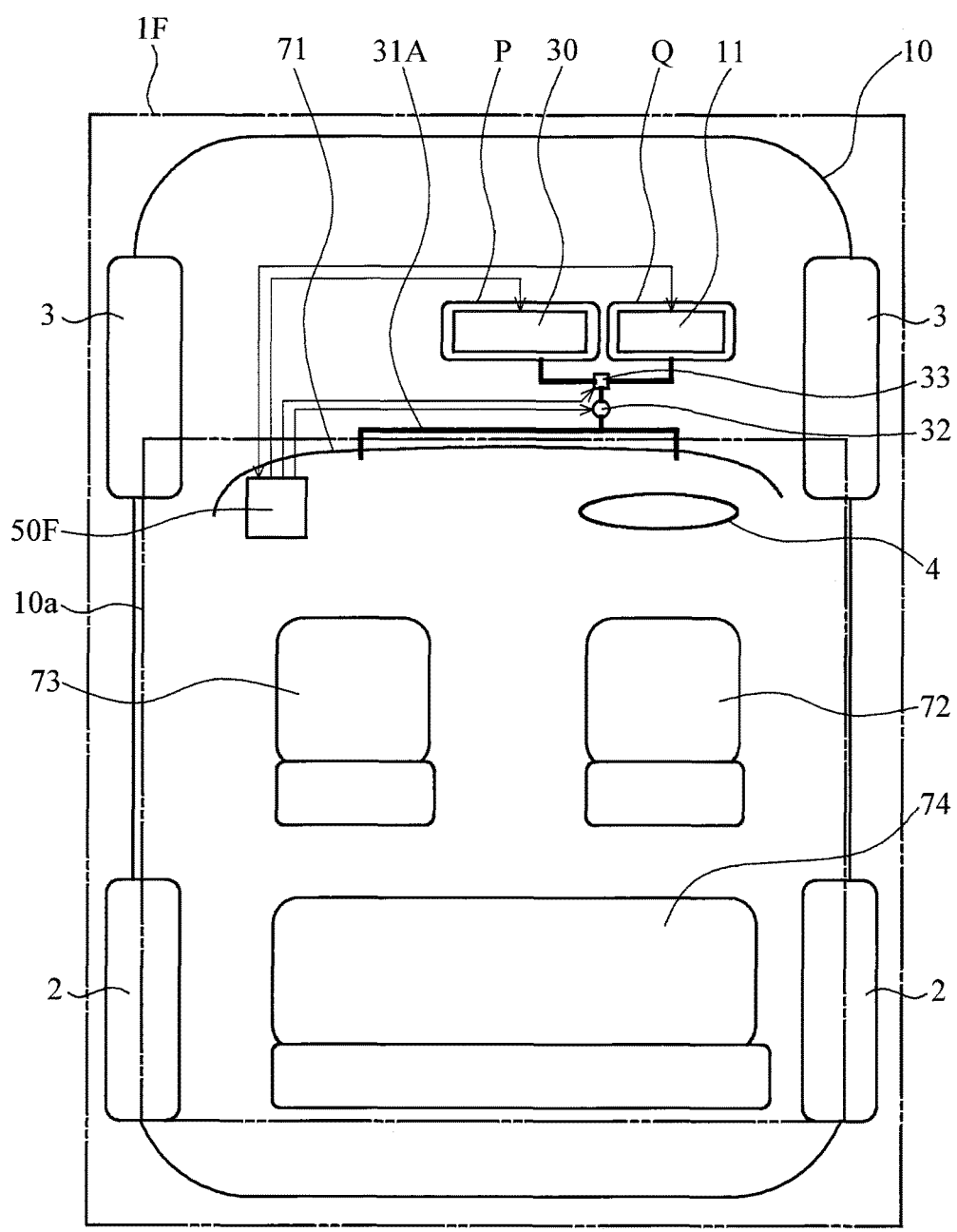
FIG. 12 is a diagrammatic configuration drawing of an electrically driven vehicle in accordance with a sixth embodiment.

As illustrated in FIG. 12, an electrically driven vehicle 1F in accordance with the present embodiment is practically same as the electrically driven vehicle 1A, except that a switching valve 33 is further provided, and a vehicle-side ECU 50F is provided instead of the vehicle-side ECU 50A. Similar modification can be applied to the electrically driven vehicles 1B through 1E.

The switching valve 33 is provided so as to locate in the part where two branching parts provided to one end side are gathered. The switching valve 33 is a switching means which can switch the communication state of the ventilation duct 31A between the state where the mounting part P of the electric heater 30 is communicated with the inside of the vehicle interior 10a and the state where the mounting part Q of the power generation device 11 is communicated with the inside of the vehicle interior 10a.

The vehicle-side ECU 50F is practically same as the vehicle-side ECU 50A, except that the switching valve 33 is further electrically connected, and a switch control means described later is functionally achieved.

The switch control means controls the switching valve 33 to switch the communication state of the ventilation duct 31A in accordance with the air conditioning means to be used.

Specifically, the switch control means executes the control to switch the switching valve 33 to the electric heater 30 side by making the mounting part P of the electric heater 30 communicated with the inside of the vehicle interior 10a when the air conditioning means to be used is the electric heater 30.

In addition, the switch control means executes the control to switch the switching valve 33 to the power generation device 11 side by making the mounting part Q of the power generation device 11 communicated with the inside of the vehicle interior 10a when the air conditioning means to be used is the power generation device 11.

The switch means capable of switching the communication state of the ventilation duct 31A may be achieved by a set of the opening/closing means which can separately open and close the flow paths of two branching parts which are branched in accordance with the electric heater 30 and the power generation device 11, for example. In addition, the switch means may be configured so as to be able to switch the communication state of the ventilation duct 31A to the state where the electric heater 30 and the power generation device 11 are communicated with the inside of the vehicle interior 10a. When the air conditioning means to be used is the electric heater 30 and the power generation device 11, the switch control means may execute the control to switch the switch means so that each of the mounting part P of the electric heater 30 and the mounting part Q of the power generation device 11 is communicated with the inside of the vehicle interior 10a.

Figure 13:
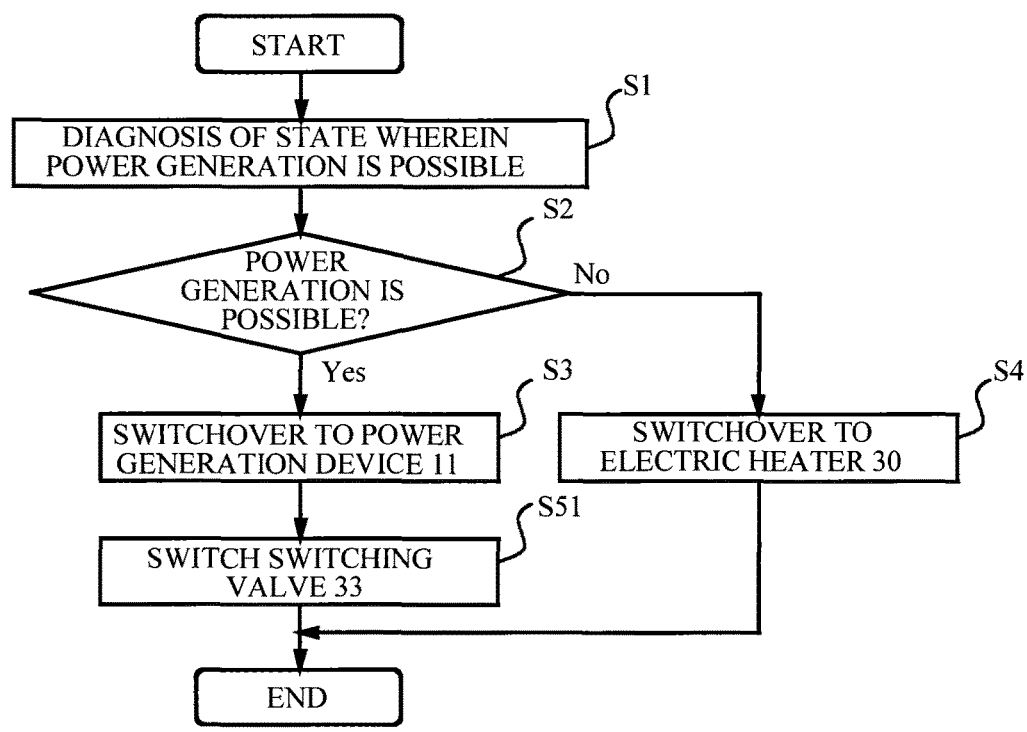
FIG. 13 is a flowchart illustrating an operation of the vehicle-side ECU in accordance with the sixth embodiment.

A description will now be given of the operation of the vehicle-side ECU 50F with reference to the flowchart illustrated in FIG. 13. This flowchart is same as the flowchart illustrated in FIG. 4, except that a step S51 is added. Therefore, here, a description will be given of especially this step. Subsequent to the step S3 or the step S4, the vehicle-side ECU 50F switches the switching valve 33 to the air conditioning means to be used side (step S51). Specifically, when the process moves to the step S51 from the step S3, the vehicle-side ECU 50F switches the switching valve 33 to the power generation device 11 side, and when the process moves to the step S51 from the step S4, the vehicle-side ECU 50F switches the switching valve 33 to the electric heater 30 side. When the air conditioning means to be used is the electric heater 30 and the power generation device 11, the vehicle-side ECU 50F may further switch the switching valve 33 so that each of the mounting part P of the electric heater 30 and the mounting part Q of the power generation device 11 is communicated with the inside of the vehicle interior 10a in this step.

A description will be given of advantages of the electrically driven vehicle 1F. In the electrically driven vehicle 1F, the switching valve 33 which can switch the communication state of the ventilation duct 31A in accordance with the air conditioning means to be used is provided in the ventilation duct 31A. Therefore, when the power generation device 11 is not mounted or when the air-conditioning operation is not executed by the power generation device 11, the electrically driven vehicle 1F can prevent the un-air-conditioned air from flowing in the vehicle interior 10a from the mounting part Q of the power generation device 11, and can prevent the air which is air-conditioned by the electric heater 30 from flowing out to the mounting part Q of the power generation device 11.

Therefore, compared to the electrically driven vehicle 1A, the electrically driven vehicle 1F can ensure the properness of the use of the air conditioning because it can prevent the decrease in air-conditioning performance when the power generation device 11 is not mounted or when the power generation device 11 is not used for the air conditioning.

Seventh Embodiment

Figure 14:
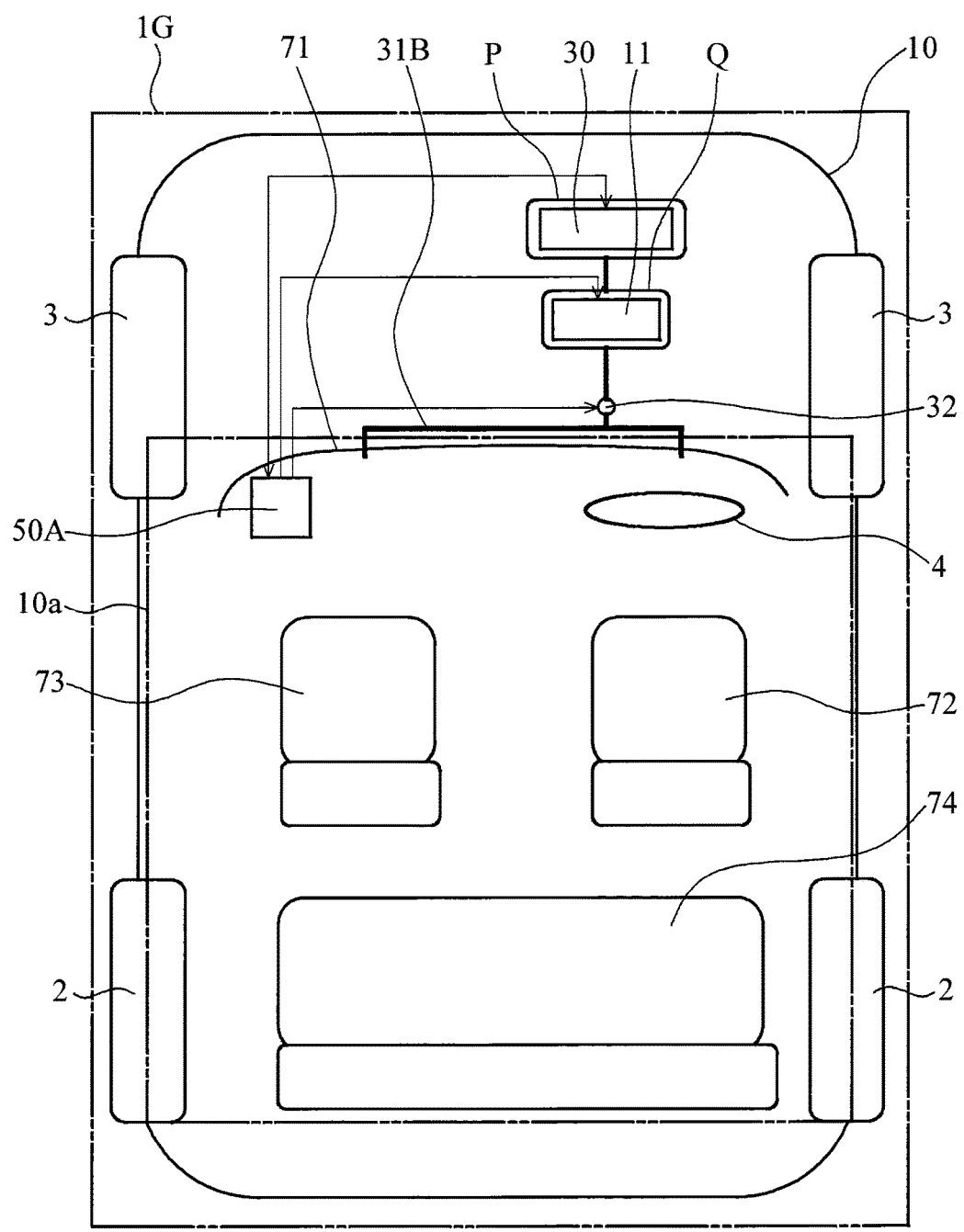
FIG. 14 is a diagrammatic configuration drawing of an electrically driven vehicle in accordance with a seventh embodiment.

As illustrated in FIG. 14, an electrically driven vehicle 1G in accordance with the present embodiment is practically same as the electrically driven vehicle 1A, except that the mount positions of the power generation device 11 and the electric heater 30 are different, and a ventilation duct 31B is provided instead of the ventilation duct 31A. Similar modification may be applied to each electrically driven vehicle described in other embodiments such as the electrically driven vehicle 1B for example. In the electrically driven vehicle 1G, the ventilation duct 31B is provided so that mounting parts P and Q of the power generation device 11 and the electric heater 30 are connected in series.

In the electrically driven vehicle 1G, the blast fan 32 is provided to the gathering part which is the part before the ventilation duct 31B is diverged to each part of the vehicle interior 10a. Specifically, the ventilation duct 31B is located downstream of the mounting part P of the electric heater 30 and the mounting part Q of the power generation device 11 in the gathering part. Locations of the mounting part P of the electric heater 30 the mounting part Q of the power generation device 11 can be switched each other.

A description will now be given of advantages of the electrically driven vehicle 1G. In the electrically driven vehicle 1G, the ventilation duct 31B is provided so that mounting part P of the electric heater 30 and the mounting part Q of the power generation device 11 are connected in series. Thus, the electrically driven vehicle 1G can have a structure which has an advantage in cost by simplifying the ventilation duct 31B.

In addition, in the electrically driven vehicle 10, the air air-conditioned by the electric heater 30 can be blown into the vehicle interior 10a even when the power generation device 11 is not mounted or even when the power generation device 11 does not generate electric power. Therefore, compared to the electrically driven vehicle 1F, the electrically driven vehicle 1G may have a structure which has an advantage in cost because the switching valve 33 becomes unnecessary.

In addition, even when the ventilation duct 31B is provided as described, the electrically driven vehicle 1G may have a structure which has an advantage in cost because the air-conditioning operation can be executed by the blast fan 32 common to the electric heater 30 and the power generation device 11.

Eighth Embodiment

Figure 15:
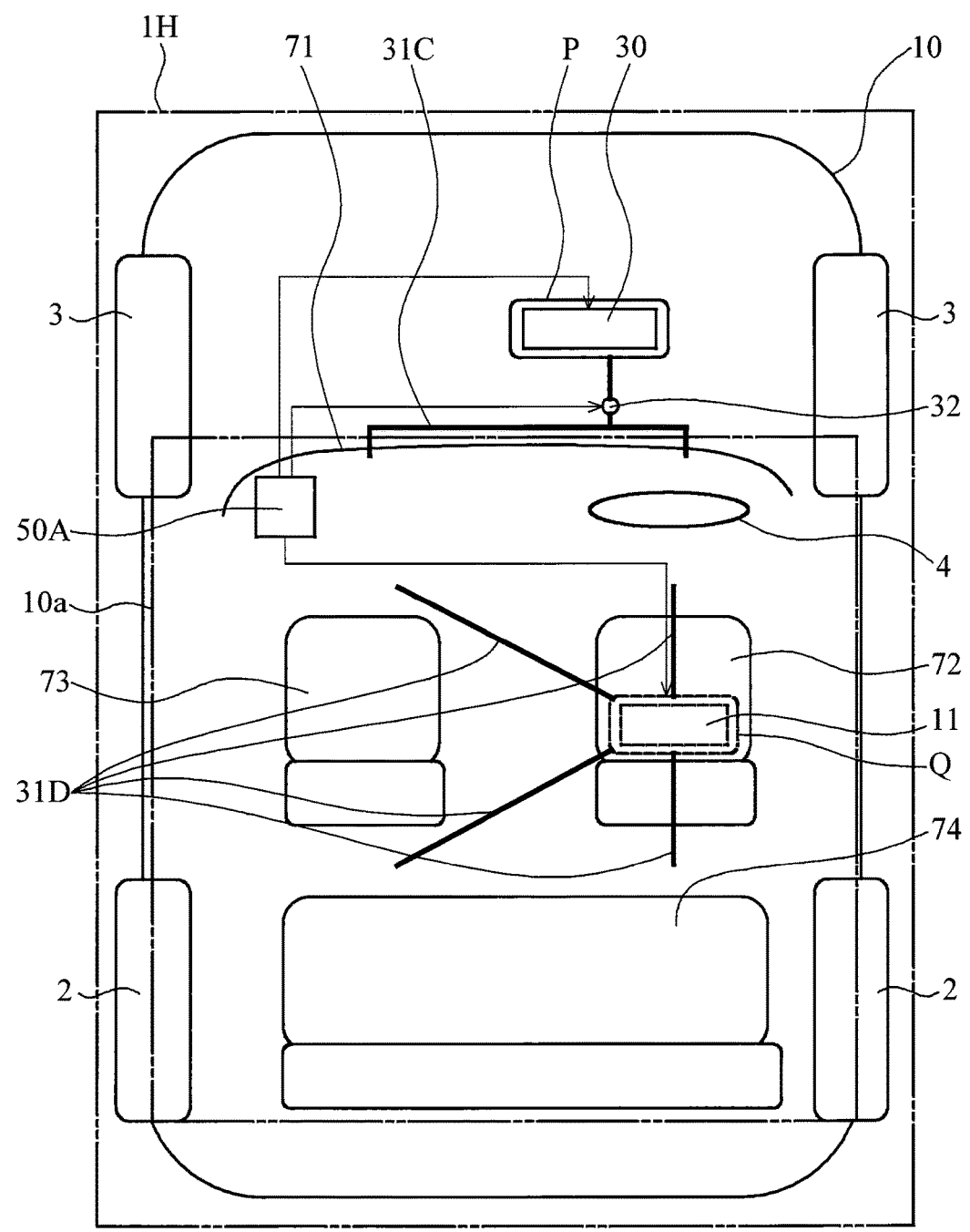
FIG. 15 is a diagrammatic configuration drawing of an electrically driven vehicle in accordance with an eighth embodiment.

As illustrated in FIG. 15, an electrically driven vehicle 1H in accordance with the present embodiment is practically same as the electrically driven vehicle 1A, except that the mount position of the power generation device 11 is different and ventilation ducts 31C and 31D are provided instead of the ventilation duct 31A. Similar modification may be applied to each electrically driven vehicle described in other embodiments such as the electrically driven vehicle 1B, for example.

In the electrically driven vehicle 1H, the power generation device 11 is provided to the inside of the vehicle interior 10a. Specifically, in the electrically driven vehicle 1H, the power generation device 11 is located under the driver seat 72 as illustrated with dashed line. The ventilation duct 31C makes the mounting part P of the electric heater 30 communicated with the inside of the vehicle interior 10a. The ventilation duct 31D are composed of ventilation ducts which are provided so as to blow waste heat which is heat released from the power generation device 11 in operation toward each of seats 72, 73 and 74 from the mounting part Q of the power generation device 11. For the blast of the ventilation duct 31D, dedicated blast fan can be provided, and a radiator fan can be used when the engine 111 includes a radiator fan.

A description will now be given of advantages of the electrically driven vehicle 1H. In the electrically driven vehicle 1H, compared to the electrically driven vehicle 1A, as the power generation device 11 is provided to the inside of the vehicle interior 10a, the waste heat of the power generation device 11 can be used more efficiently when heating the vehicle interior 10a.

In addition, in the electrically driven vehicle 1H, it is possible to heat the driver seat 72, which is used most frequently, effectively by locating the power generation device 11 under the driver seat 72.

In addition, in the electrically driven vehicle 1H, the ventilation duct 31D, which directly air-conditions seats 72, 73 and 74, can be easily provided by locating the power generation device 11 under the driver seat 72. Therefore, the electrically driven vehicle 1H can have advantages in cost in achieving the air conditioning of seats 72, 73 and 74 which is more effective than the air conditioning by providing the blast exit to the dash-board 71.

Ninth Embodiment

Figure 16:
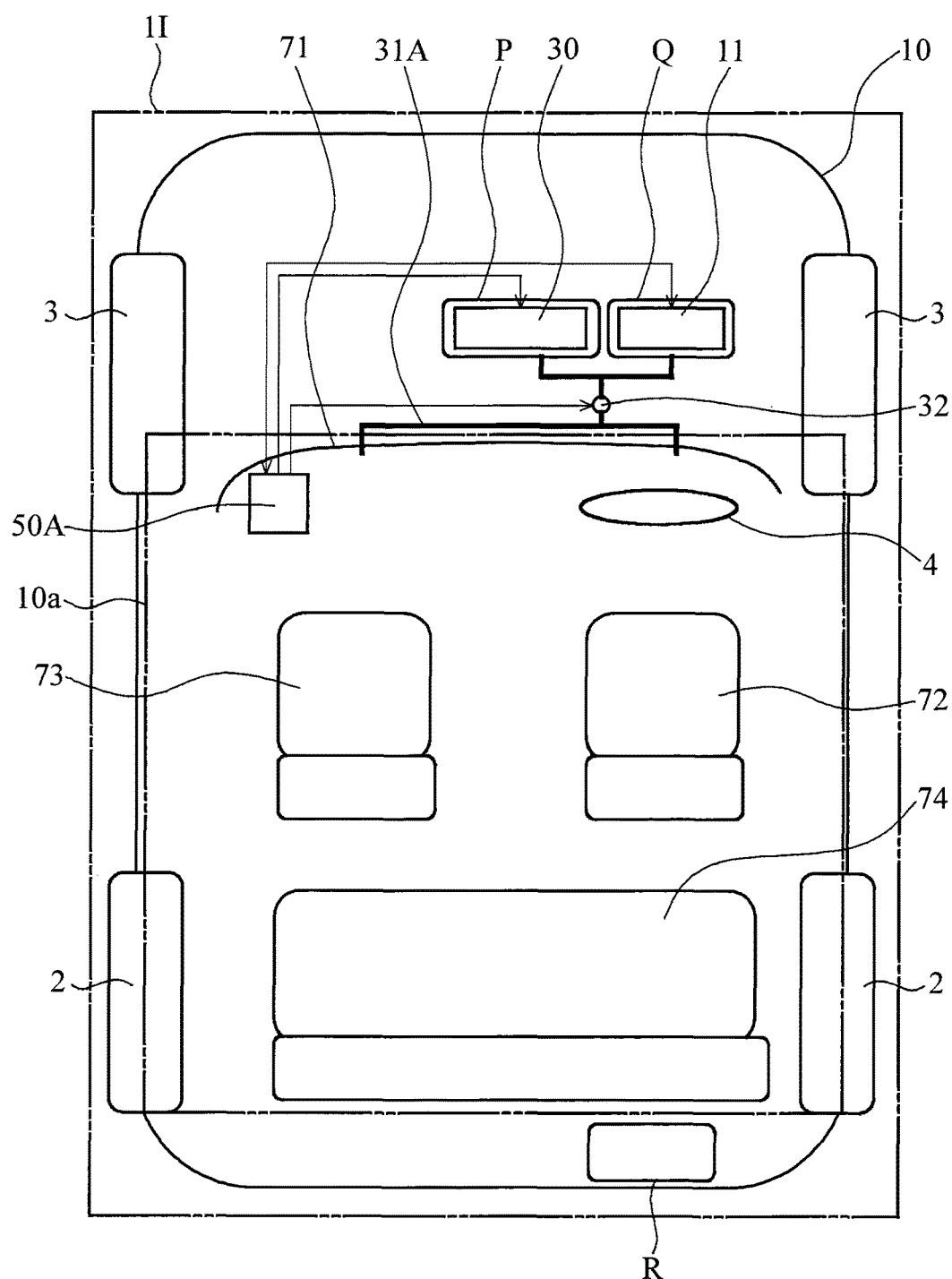
FIG. 16 is a diagrammatic configuration drawing of an electrically driven vehicle in accordance with a ninth embodiment.

As illustrated in FIG. 16, an electrically driven vehicle 1I in accordance with the present embodiment is practically same as the electrically driven vehicle 1A, except that a number of mounting parts of the power generation device 11 (here, mounting part Q and mounting part R) are provided, and that the power generation device 11 is configured to be able to be electrically connected to the battery 12 and the vehicle-side ECU 50A even when the power generation device 11 is mounted in the mounting part R. Similar modification may be applied to each electrically driven vehicle described in other embodiment such as the electrically driven vehicle 1B.

The mounting part R which is another mounting part of the power generation device 11 is not directly communicated with the inside of the vehicle interior 10a through the ventilation duct. The mounting part R is specifically provided to the part isolated from the vehicle interior 10a in the vehicle body 10. More specifically, the mounting part R is located outside the vehicle interior 10a and located in the posterior area of the vehicle interior 10a in the vehicle body 10. The electrically driven vehicle 1I is configured to be able to mount the power generation device 11 to mounting parts Q and R removably.

A description will now be given of advantages of the electrically driven vehicle 1I. In the electrically driven vehicle 1I, it is possible to prevent the waste heat of the power generation device 11 from being transferred to the inside of the vehicle interior 10a, by mounting the power generation device 11 to the mounting part R. Therefore, the electrically driven vehicle 1I can suppress the rise of the temperature inside the vehicle interior 10a, by mounting the power generation device 11 to the mounting part R in a time when the heating is unnecessary such as summer.

In addition, in the electrically driven vehicle 1I, the mounting part R is located outside the vehicle interior 10a and located in the posterior area of the vehicle interior 10a in the vehicle body 10. Therefore, compared to the case where the mounting part R is located outside the vehicle interior 10a and is located in the anterior part of the vehicle interior 10a for example, the electrically driven vehicle 1I can preferably prevent the rise of the temperature inside the vehicle interior 10a, when the power generation device 11 is mounted to the mounting part R due to the traveling direction of the vehicle or due to the airtightness of the vehicle interior 10a.

Tenth Embodiment

Figure 17:
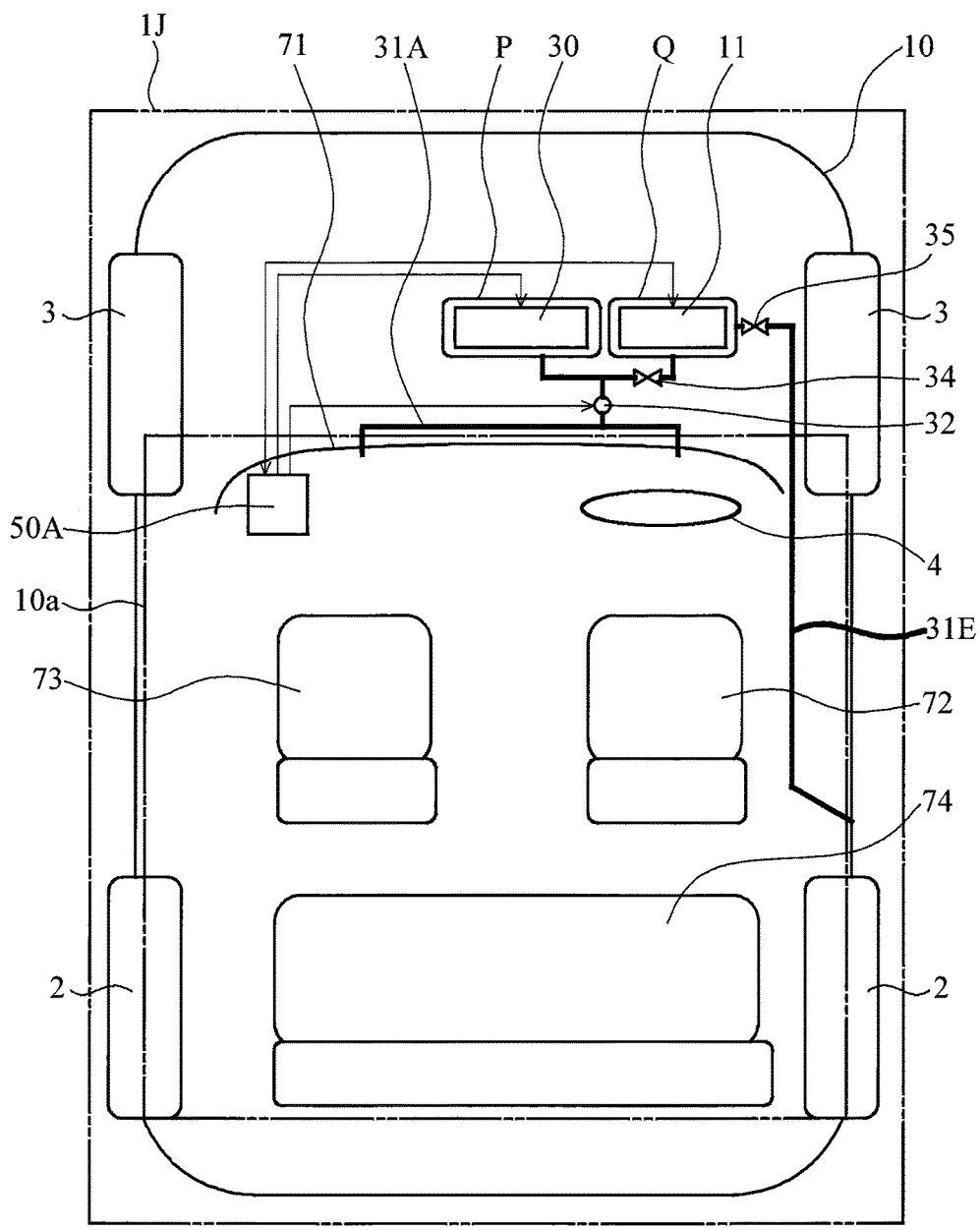
FIG. 17 is a diagrammatic configuration drawing of an electrically driven vehicle in accordance with a tenth embodiment.

As illustrated in FIG. 17, an electrically driven vehicle 1J in accordance with the present embodiment is practically same as the electrically driven vehicle 1A, except that a ventilation duct 31E is further provided, and first and second opening/closing valves 34 and 35 are further provided. Similar modification may be applied to each electrically driven vehicle described in other embodiments such as the electrically driven vehicle 1B.

The ventilation duct 31E is provided so as to make the mounting part Q of the power generation device 11 communicated with the atmosphere. The first opening/closing valve 34 is provided so as to be located in the branching part in accordance with the power generation device 11 in the ventilation duct 31A. The second opening/closing valve 35 is provided so as to be located in the ventilation duct 31E.

First and second opening/closing valves 34 and 35 can be opened and closed by electronic control, for example. In this case, first and second opening/closing valves 34 and 35 can be opened and closed by further achieving a control means, which opens the first opening/closing valve 34 and closes the second opening/closing valve 35 when the air-conditioning operation is executed (when the air conditioning switch 23 is ON), and which closes the first opening/closing valve 34 and opens the second opening/closing valve 35 when the air-conditioning operation is not executed (when the air conditioning switch 23 is OFF), in the vehicle-side ECU 50A, for example. However, not limited to this, first and second opening/closing valves 34 and 35 can be configured to be able to be opened and closed by the manual operation, for example.

A description will now be given of advantages of the electrically driven vehicle 1J. In the electrically driven vehicle 1J, it is possible to prevent the air heated by waste heat of the power generation device 11 from being blown into the inside of the vehicle interior 10a, by closing the first opening/closing valve 34 and opening the second opening/closing valve 35 at the same time. Thus, the electrically driven vehicle 1J can suppress the rise of the temperature of the vehicle interior 10a, by closing the first opening/closing valve 34 and opening the second opening/closing valve 35 at the same time in a time when the heating is unnecessary such as summer.

The electrically driven vehicle 1J can preferably suppress the rise of the temperature of the vehicle interior 10a, by making the air heated by waste heat of the power generation device 11 flow out to the atmosphere through the ventilation duct 31E in a case where the air conditioning is not necessary while the electric power generation is necessary.

In addition, the electrically driven vehicle 1J can use a space of the vehicle body 10 effectively because it is not necessary to include the mounting part R like the electrically driven vehicle 1I does.

The above-described embodiments are exemplary preferred embodiments of the present invention. However, the present invention is not limited to those, but may include various embodiments and variations without departing from the scope of the present invention.

For example, the description was given of a case where the electric heater 30 and the power generation device 11 are first and second air conditioning means, and both are air conditioning means which execute the heating operation.

However, the present invention is not limited to this, for example, the first air conditioning means may be an air conditioning device including a compressor which operates by using the battery power, and the second air conditioning means may be an air conditioning device including a compressor which operates by using an energy other than the battery power (e.g. an output of an engine or an engine provided to a power generation device driven by engine).

In this case, when the cooling operation is executed as the air-conditioning operation, it is possible to ensure the cruising distance, suppress the decrease in energy efficiency due to the increase of the weight, and ensure the properness of the use of the air conditioning simultaneously.

Furthermore, in this case, first and second air conditioning means may include a common compressor which is configured to be able to switch the energy to be used between the battery power and the energy other than the battery power. In this case, it is possible to suppress the decrease in energy efficiency due to the increase of the weight, by configuring the second air conditioning means so that the compressor is provided to the vehicle body, and the part other than the compressor (e.g. an engine body capable of driving the compressor, or a power generation device body driven by the engine) is partly removably mounted to the vehicle body.

In the above embodiment, the description was given of a case where the power generation device 11 driven by an engine is the second air conditioning means which generates electric power by using fuel, and executes the air-conditioning operation which uses waste heat in electric power generation.

However, the present invention is not limited to this, the second air conditioning means which generates electric power by using fuel, and executes the air-conditioning operation which uses the waste heat in electric power generation may be a fuel-cell power generation device, for example. In this case, the second air conditioning means can execute the air-conditioning operation which uses heat released from the fuel-cell power generation device as waste heat in electric power generation, for example.

In the above embodiment, the description was given of a case where the power generation device 11 is the second air conditioning means which executes the air-conditioning operation which uses heat released from the engine 111 as waste heat in electric power generation.

However, the present invention is not limited to this, the second air conditioning means may be a power generation device driven by an engine, which includes a heat exchanger that cools a cooling medium, and includes a cooling medium cooled engine which executes the air-conditioning operation which uses heat released from the cooling medium in the heat exchanger. In this case, it is possible to suppress the decrease in energy efficiency due to the increase of the weight, by configuring the second air conditioning means so that the heat exchanger is provided to the vehicle body and the part other than the heat exchanger (e.g. the power generation device body) is partly removably mounted to the vehicle body.

In this case, the second air conditioning means may execute the air-conditioning operation which uses both heat released from the engine and heat released from the heat exchanger, for example.

The modification described above may be applied to the case where the fuel-cell power generation device, which is the second air conditioning means, is the cooling medium cooled power generation device.

In the third embodiment described above, the description was given of a case where the air conditioning change means adjusts the use ratio between the electric heater 30 and the power generation device 11 in accordance with the state of the adjustment switch 25.

However, the present invention is not limited to this, the air conditioning change means may adjust the use ratio between the first air conditioning means and the second air conditioning means based on the information capable of being acquired from the in-car navigation device.

In this case, it may be possible to execute the proper air-conditioning operation in accordance with the usage conditions of the vehicle by decreasing the use ratio of the first air conditioning means as the distance to the home and the electricity station which has a charging facility becomes longer, or by decreasing the use ratio of the first air conditioning means as the distance to the set destination becomes longer. Moreover, in this case, the operation means capable of selecting whether adjusting the use ratio may be further provided. According to this, it is possible to check whether the adjustment of the use ratio matches to the user's resolve.

In the above embodiments, various types of means functionally achieved by each vehicle-side ECU such as the vehicle-side ECU 50A may be achieved by other control devices, hardware devices such as dedicated electronic circuits, or combination of those.

DESCRIPTION OF LETTERS OR NUMERALS

1A, 1B, 1C, 1D, 1E, 1F, 1G, 1H, 1I, 1J electrically driven vehicle
10 vehicle body
10a vehicle interior
11 power generation device
111 engine
12 battery
30 electric heater
31A, 31B, 31C, 31D, 31E ventilation duct
32 blast fan
33 switching valve
34 first opening/closing valve
35 second opening/closing valve
50A, 50B, 50C, 50D, 50E, 50F vehicle-side ECU

The invention claimed is:
1. An electrically driven vehicle comprising:
a vehicle body provided with a vehicle interior;
a battery which is mounted to the vehicle body and is usable for running;
an electric motor which is supplied with electric power from the battery and rotates an output shaft, a rotation output of the output shaft being transmitted to drive wheels via a transmission;
a first air conditioning unit which executes an air-conditioning operation which uses the electric power of the battery when air-conditioning the vehicle interior;
a power generation device that includes a power generator and an engine to drive the power generator with fuel and is at least partly removably mounted to the vehicle body, electric power generated by the power generator being used to charge the battery, the power generation device being a second air conditioning unit that executes an air-conditioning operation other than the air-conditioning operation which uses the electric power of the battery when air-conditioning the vehicle interior, the electrically driven vehicle being configured to operate by the battery even when the power generation device is not mounted in the electrically driven vehicle and an electric connection with the power generation device is cut in order to suppress a decrease in energy efficiency due to an increase of weight from the power generation device;
a mount detection sensor to detect mount/unmount of the power generation device; and
an air conditioning change unit which changes at least one of use states of the first air conditioning unit and the second air conditioning unit on the basis of the mount/unmount of the power generation device detected by the mount detection sensor, and selects the first air conditioning unit when the mount detection sensor detects unmount of the power generation device, wherein
the second air conditioning unit executes at least one of an air-conditioning operation which uses waste heat of the engine and another air-conditioning operation which uses heat released from a cooling medium to cool the engine.

2. The electrically driven vehicle according to claim 1, wherein the air conditioning change unit switches an air conditioning unit to be used between the first air conditioning unit and the second air conditioning unit.

3. The electrically driven vehicle according to claim 2, wherein the air conditioning change unit switches the air conditioning unit to be used between the first air conditioning unit and the second air conditioning unit in accordance with whether the second air conditioning unit is operable.

4. The electrically driven vehicle according to claim 1, wherein the air conditioning change unit adjusts a use ratio between the first air conditioning unit and the second air conditioning unit.

5. The electrically driven vehicle according to claim 3, wherein the air conditioning change unit changes the use ratio in accordance with an amount of charge of the battery.

6. The electrically driven vehicle according to claim 1, wherein the air conditioning change unit adjusts an air-conditioning capacity of the first air conditioning unit so that the air-conditioning capacity of the first air conditioning unit is decreased in a case where a difference between a target temperature set for executing the air-conditioning operation and an actual temperature inside the vehicle interior is smaller than a given value in a state where at least the first air conditioning unit executes the air-conditioning operation.

7. The electrically driven vehicle according to claim 1, further comprising a blast portion common to the first air conditioning unit and the second air conditioning unit when air-conditioning the vehicle interior.

8. An electrically driven vehicle comprising:
a vehicle body provided with a vehicle interior;
a battery which is mounted to the vehicle body and is usable for running;

an electric motor which is supplied with electric power from the battery and rotates an output shaft, a rotation output of the output shaft being transmitted to drive wheels via a transmission;

a first air conditioner which executes an air-conditioning operation which uses the electric power of the battery when air-conditioning the vehicle interior;

a power generation device that includes a power generator and an engine to drive the power generator with fuel and is at least partly removably mounted to the vehicle body, electric power generated by the power generator being used to charge the battery, the power generation device being a second air conditioner that executes an air-conditioning operation other than the air-conditioning operation which uses the electric power of the battery when air-conditioning the vehicle interior, the electrically driven vehicle being configured to operate by the battery even when the power generation device is not mounted in the electrically driven vehicle and an electric connection with the power generation device is cut in order to suppress a decrease in energy efficiency due to an increase of weight from the power generation device;

a mount detection sensor to detect mount/unmount of the power generation device; and circuitry configured to change at least one of use states of the first air conditioner and the second air conditioner on the basis of the mount/unmount of the power generation device detected by the mount detection sensor, and to select the first air conditioner when the mount detection sensor detects unmount of the power generation device, wherein the second air conditioner executes at least one of an air-conditioning operation which uses waste heat of the engine and another air-conditioning operation which uses heat released from a cooling medium to cool the engine.

9. The electrically driven vehicle according to claim 8, wherein the circuitry is configured to switch an air conditioner to be used between the first air conditioner and the second air conditioner.

10. The electrically driven vehicle according to claim 9, wherein the circuitry is configured to switch the air conditioner to be used between the first air conditioner and the second air conditioner in accordance with whether the second air conditioner is operable.

11. The electrically driven vehicle according to claim 8, wherein the circuitry is configured to adjust a use ratio between the first air conditioner and the second air conditioner.

12. The electrically driven vehicle according to claim 11, wherein the circuitry is configured to change the use ratio in accordance with an amount of charge of the battery.

13. The electrically driven vehicle according to claim 11, further comprising a switch to adjust the use ratio, wherein the circuitry is configured to adjust the use ratio in accordance with a state of the switch.

14. The electrically driven vehicle according to claim 8, wherein the circuitry is configured to adjust an air-conditioning capacity of the first air conditioner so that the air-conditioning capacity of the first air conditioner is decreased in a case where a difference between a target temperature set for executing the air-conditioning operation and an actual temperature inside the vehicle interior is smaller than a given value in a state where at least the first air conditioner executes the air-conditioning operation.

15. The electrically driven vehicle according to claim 8, further comprising a fan common to the first air conditioner and the second air conditioner when air-conditioning the vehicle interior.

* * * * *